(12) United States Patent
Mubarek et al.

(10) Patent No.: US 9,262,058 B2
(45) Date of Patent: Feb. 16, 2016

(54) SYSTEM AND METHODS FOR NAVIGATING SOCIAL NETWORKS

(71) Applicant: RESEARCH IN MOTION LIMITED, Waterloo (CA)

(72) Inventors: Ali Omer Mubarek, Ottawa (CA); Arnold Sheynman, Northbrook, IL (US); Jia Chang Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 303 days.

(21) Appl. No.: 13/778,021

(22) Filed: Feb. 26, 2013

(65) Prior Publication Data

US 2014/0245163 A1    Aug. 28, 2014

(51) Int. Cl.
G06F 3/00      (2006.01)
G06F 3/0484    (2013.01)

(52) U.S. Cl.
CPC .................................. *G06F 3/0484* (2013.01)

(58) Field of Classification Search
CPC ........................................................ G06F 3/00
USPC ........................ 715/738, 753, 733, 741, 762
See application file for complete search history.

(56) References Cited

U.S. PATENT DOCUMENTS

| 6,629,097 | B1 * | 9/2003 | Keith |
| 7,373,606 | B2 * | 5/2008 | Gorzela ......................... 715/738 |
| 7,594,191 | B2 * | 9/2009 | Leidig et al. .................. 715/825 |
| 8,041,125 | B2 * | 10/2011 | Sinha et al. ................... 382/225 |
| 8,284,990 | B2 * | 10/2012 | Ma et al. ....................... 382/103 |
| 8,312,380 | B2 * | 11/2012 | Churchill et al. ............. 715/753 |
| 8,332,782 | B1 | 12/2012 | Chang et al. |
| 8,862,622 | B2 * | 10/2014 | Zivkovic et al. .............. 707/780 |
| 8,880,607 | B1 * | 11/2014 | Merom et al. ................ 709/204 |
| 2005/0055639 | A1 | 3/2005 | Fogg |
| 2006/0106847 | A1 | 5/2006 | Eckardt, III et al. |
| 2011/0161827 | A1 * | 6/2011 | Dedis et al. ................... 715/738 |
| 2012/0166961 | A1 * | 6/2012 | Frazier .......................... 715/738 |

OTHER PUBLICATIONS

Extended European Search report mailed Jul. 9, 2013, in corresponding European patent application No. 13156743.0.

* cited by examiner

*Primary Examiner* — Amy Ng
*Assistant Examiner* — Meseker Takele
(74) *Attorney, Agent, or Firm* — Jeffrey N. Giunta; Fleit Gibbons Gutman Bongini & Bianco P.L.

(57) ABSTRACT

Systems and methods are provided for enabling social network navigation. The method at a client device comprises obtaining a node graph from a social networking service, the node graph comprising a plurality of nodes visualizing a social network, each node having an associated profile corresponding to a member in the social network; displaying the node graph; enabling navigation through the node graph to display portions of the node graph in corresponding views; updating the displayed node graph after receiving an update for at least one profile from the social networking service; and updating the displayed node graph after detecting a first interaction with at least one node in the node graph.

17 Claims, 15 Drawing Sheets

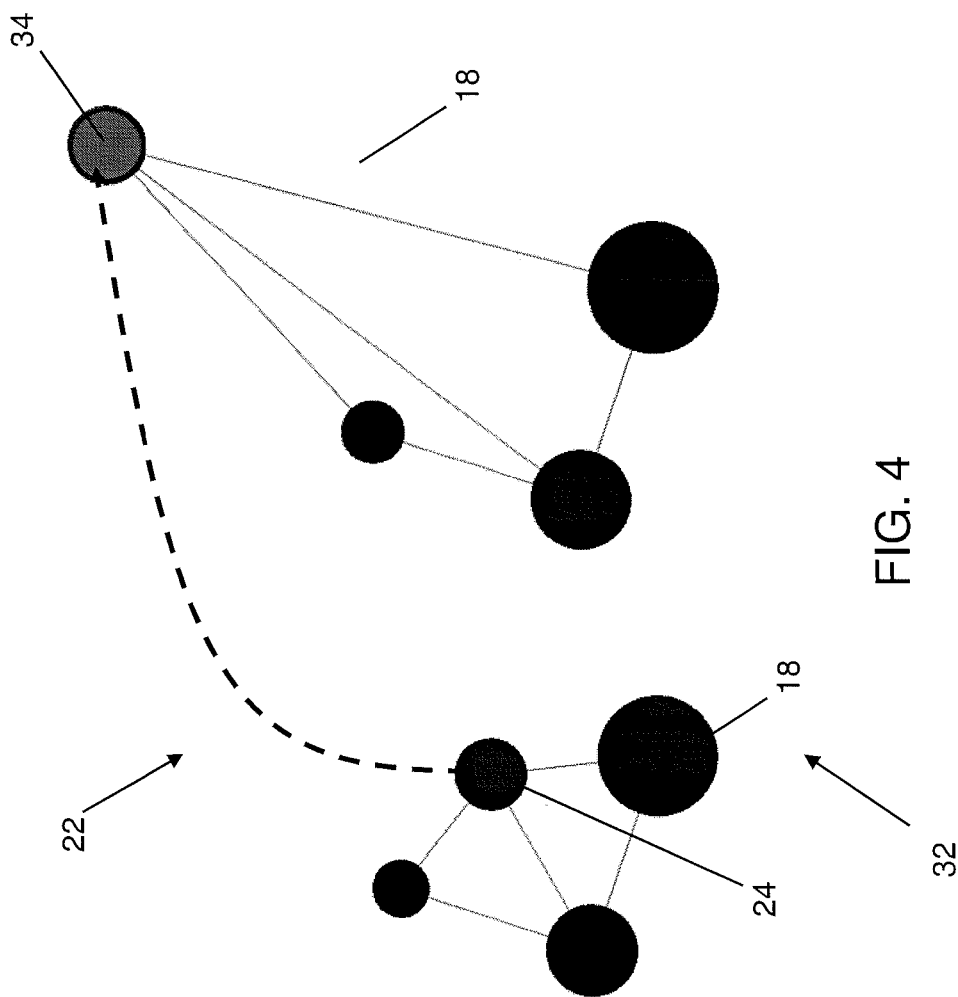
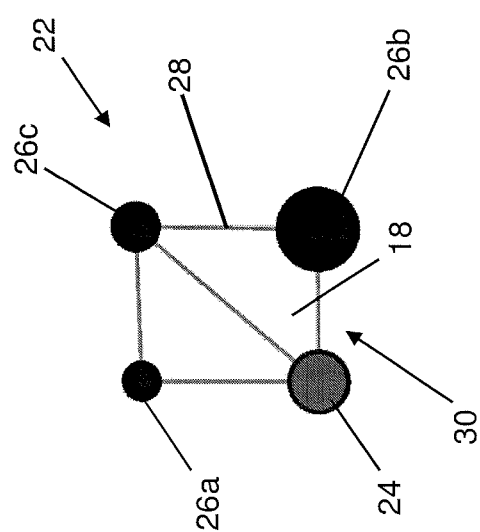
FIG. 4
FIG. 3

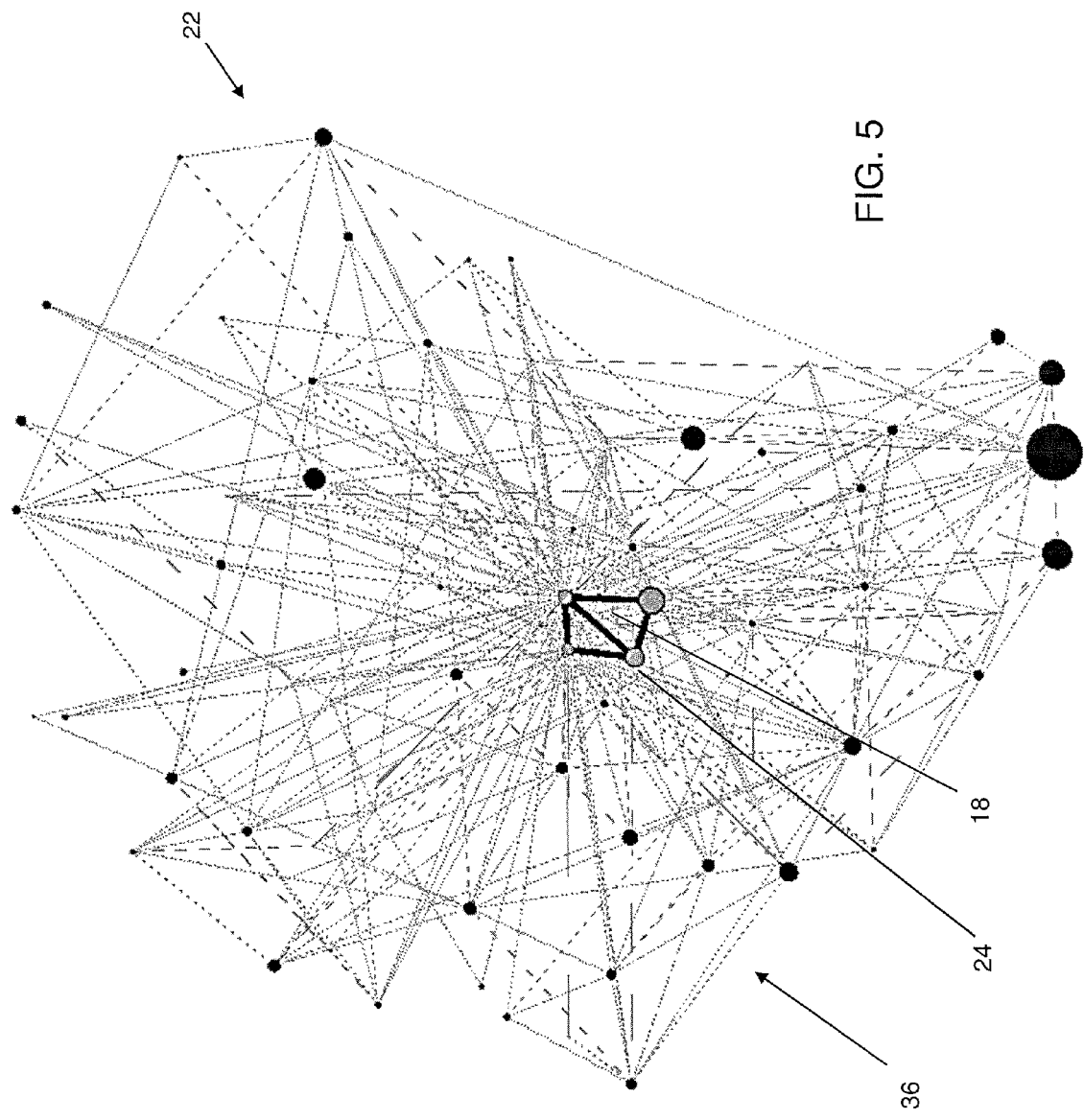

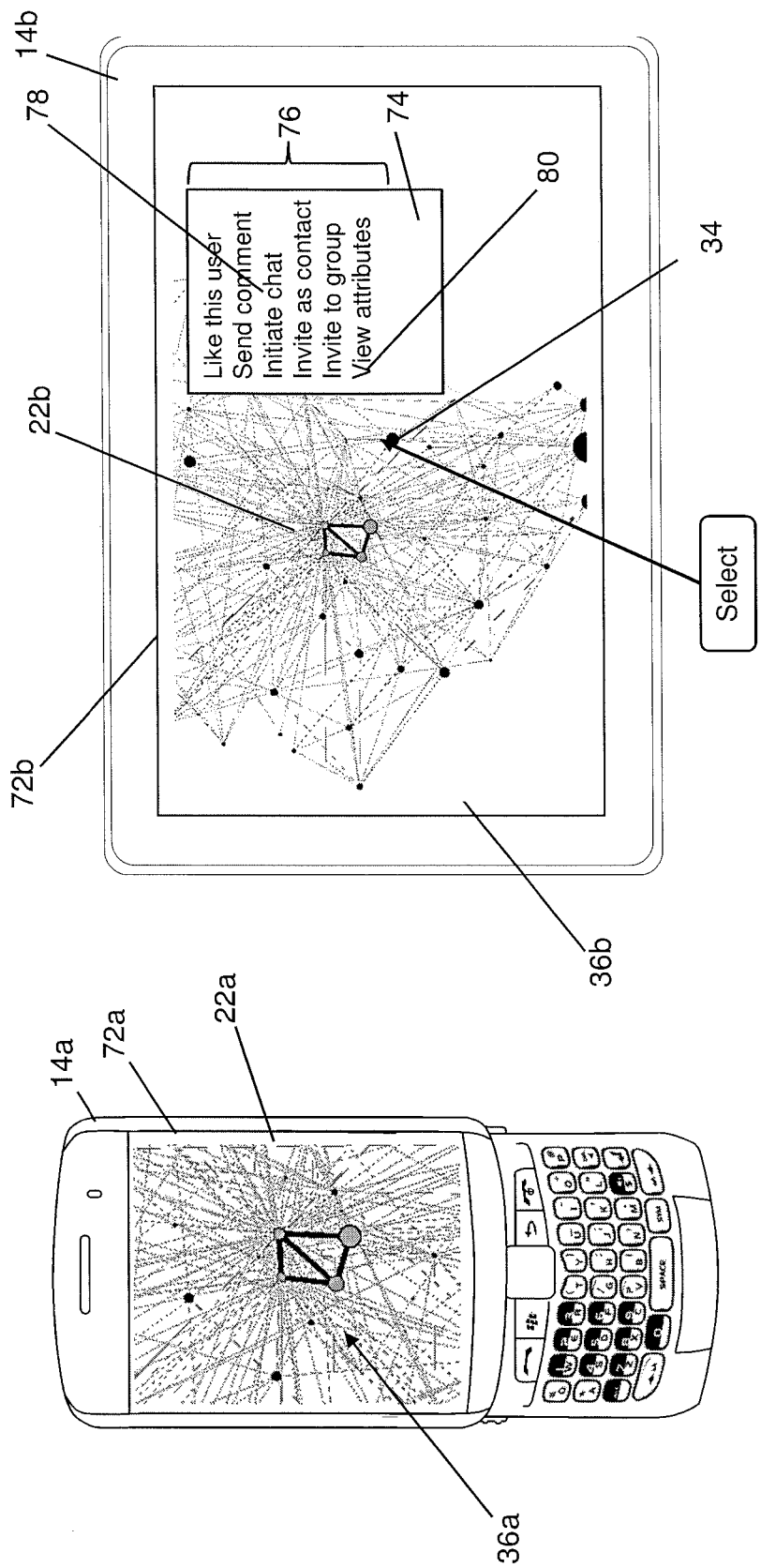

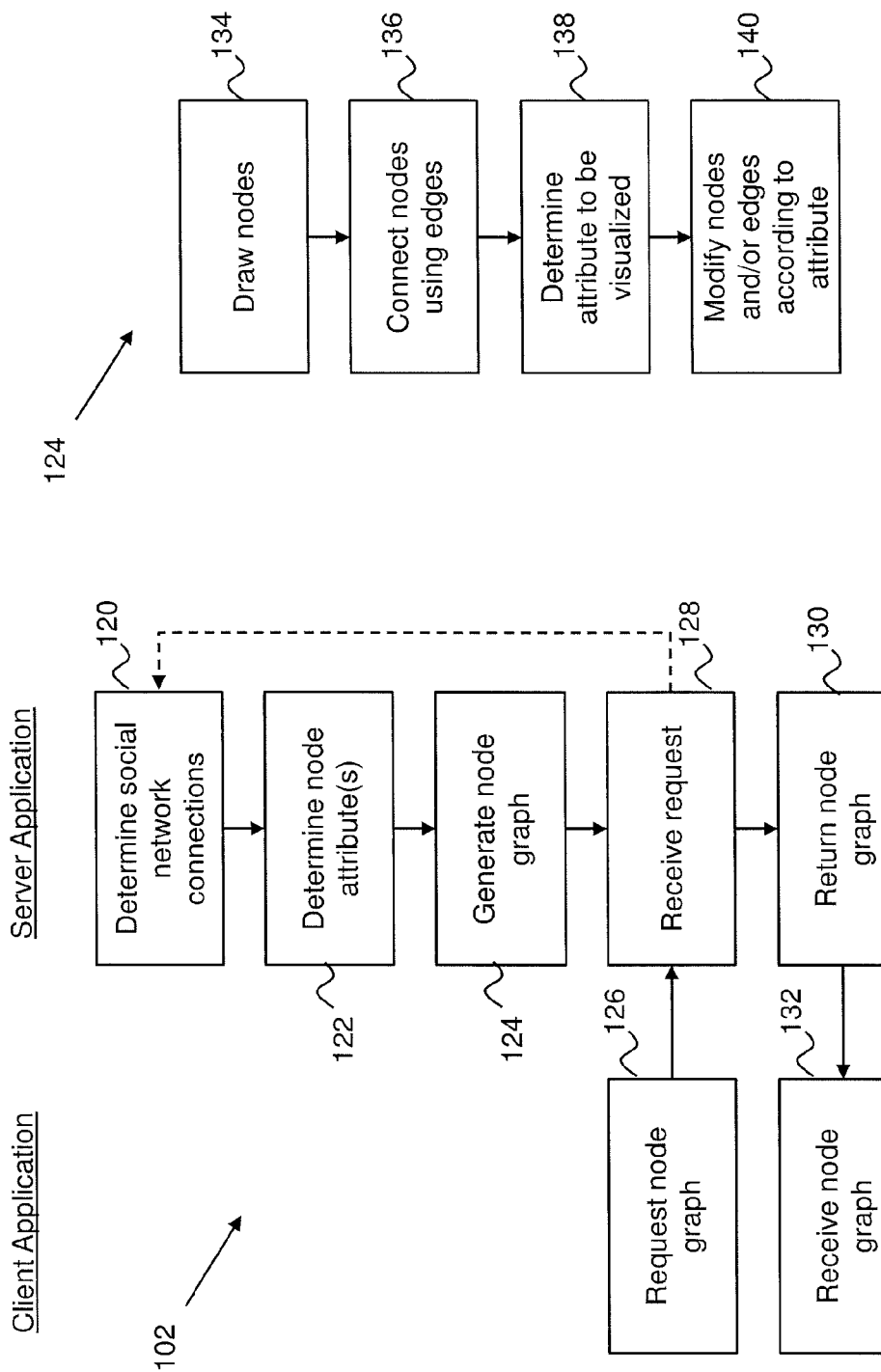

SYSTEM AND METHODS FOR NAVIGATING SOCIAL NETWORKS

TECHNICAL FIELD

The following relates to systems and methods for navigating social networks.

DESCRIPTION OF THE RELATED ART

Systems and services which electronically or virtually establish and reflect social connections, networks, and relationships among individuals (e.g., human users); are typically referred to as social networking services. Social networking services often provide any one or more of an online service, communication platform, and website. Members of a social networking service may share, among other things, data, information, ideas, interests, activities, events, web links and other content, news items, within their individual network, typically comprised of other members to which a "connection" has been established.

A primary goal of a social networking service is not only to acquire as many members as possible, but to facilitate connections between these members. Social networking services also strive to, and often rely on, engagement of members with the features offered by the social networking service, e.g., to obtain advertising revenue. To achieve this goal, social networking services encourage members to establish connections with others and may, in some cases, provide assistance in making connections, e.g., by providing "friend" recommendations. If such mechanisms operate as intended, individual members become more "connected", thus being more likely to stay engaged with the social networking service and promoting a more efficient flow of information through the social network.

Social networking members often engage only a few other members and may be exposed to only a small portion of the overall social network. For example, a member may have a list of friends, contacts, or "buddies", and may be able to view contacts of their contacts (i.e. "friends of friends"). Despite providing a glimpse into the inner networks of others, the ability to connect to others in a social network often relies on searching for contacts or receiving recommendations from other members or the social networking service itself.

BRIEF DESCRIPTION OF THE DRAWINGS

Embodiments will now be described by way of example only with reference to the appended drawings wherein:

FIG. 3 is an example of a user interface providing a visualization of social network connections;

FIG. 4 is an example of a user interface providing a visualization of social network connections;

FIG. 5 is an example of a user interface providing a visualization of social network connections;

FIG. 10 is a plan view of an example of a mobile device displaying a visualization of social network connections;

FIG. 11 is a plan view of an example of a mobile device displaying a visualization of social network connections and a menu for interacting with a selected node;

FIG. 13 is a flow chart illustrating example computer executable operations that may be executed in obtaining a node graph for visualizing social network connections;

FIG. 14 is a flow chart illustrating example computer executable operations that may be executed in generating a node graph for visualizing social network connections;

DETAILED DESCRIPTION

Figure 1:
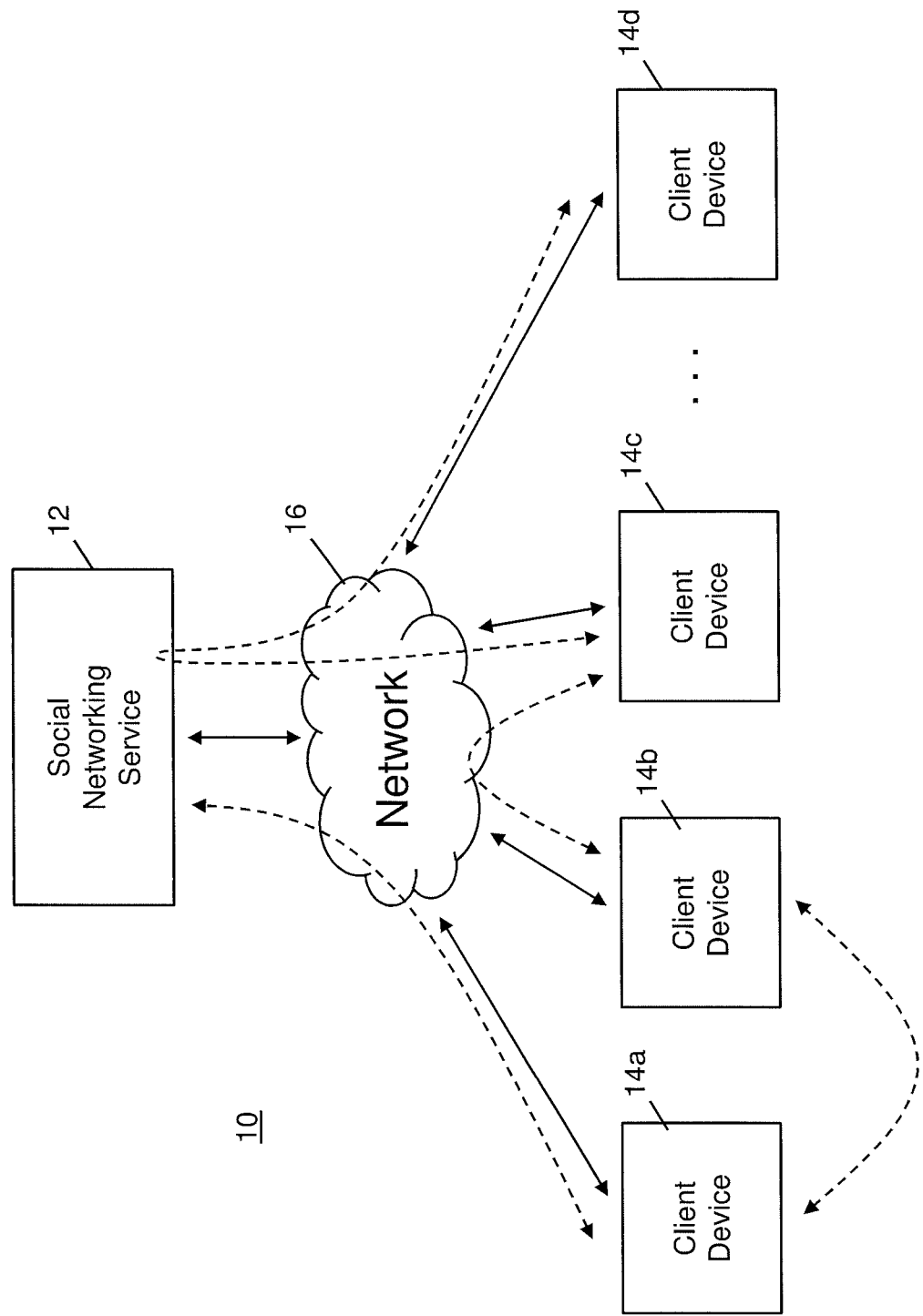
FIG. 1 is a schematic illustration of a social network.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

A user interface is described that provides comprehensive and extensive visualization of a social network using a node graph which incorporates members of the social network that are outside of a particular personal or "first level" connection network (i.e. those members or contacts in the social network that are connected directly to the user), or overlapping connection network of a direct contact or connection. In addition to providing a more comprehensive and extensive visualization using the node graph, it has been recognized that meaningful information about each node can also be conveyed in the node graph in order to promote connections in the social network that may not otherwise be formed. For example, the node graph can be modified (e.g., filtered) to reflect attributes relevant to a member associated with the device displaying the graph and/or members associated with the nodes in the node graph. Moreover, by providing a larger view of the social network, and the ability to find potentially meaningful connections, such connections can be immediately initiated, e.g., by enabling a chat to be initiated, a message to be sent or posted for the potential connection, etc. It has also been found that an available communication service, such as a messaging medium can be leveraged to combine visualization of the social network and searching within the social network beyond immediate contacts of a member of the social network, with the ability to quickly and conveniently connect with others, particularly where members of the social network utilize the same underlying messaging or communication platform.

FIG. 1 illustrates an example of a social network 10 facilitated by a social networking service 12. The social networking service 12 enables client devices 14 (e.g., first, second, third, and fourth client devices 14a, 14b, 14c, and 14d as shown in FIG. 1) to communicate with each other to establish connections and to communicate within the social network 10, e.g., via a network 16 accessible to the client devices 14. For example the third client device 14c may communicate with the fourth client device 14d via the social networking service 12 by accessing the network 16, which is also accessible to the fourth client device 14a as illustrated using the dashed line between the third and fourth client devices 14c, 14d. Client devices 14 may also communicate with the social networking service 12, e.g., to access profiles and services hosted by the social networking service 12, etc. For example, the first client device 14a may communicate directly with the social networking service 12 as shown using the dashed line therebetween.

The network 16 in the example shown in FIG. 1 may include any suitable local or wide area network, accessible using various access technologies, e.g., cellular, WiFi, Ethernet, etc. It can be appreciated that the client devices 14 may also be capable of communicating with each other within the social network 10 using short range or otherwise "direct" communication links. For example, the first client device may communicate directly with the second client device 14b without accessing the network 16 as shown using a dashed line therebetween in FIG. 1 (e.g., via a Bluetooth connection). In another example shown in FIG. 1, the second client device 14b communicates with the third client device 14c directly or "peer-to-peer" (P2P) via the network 16.

Figure 2:
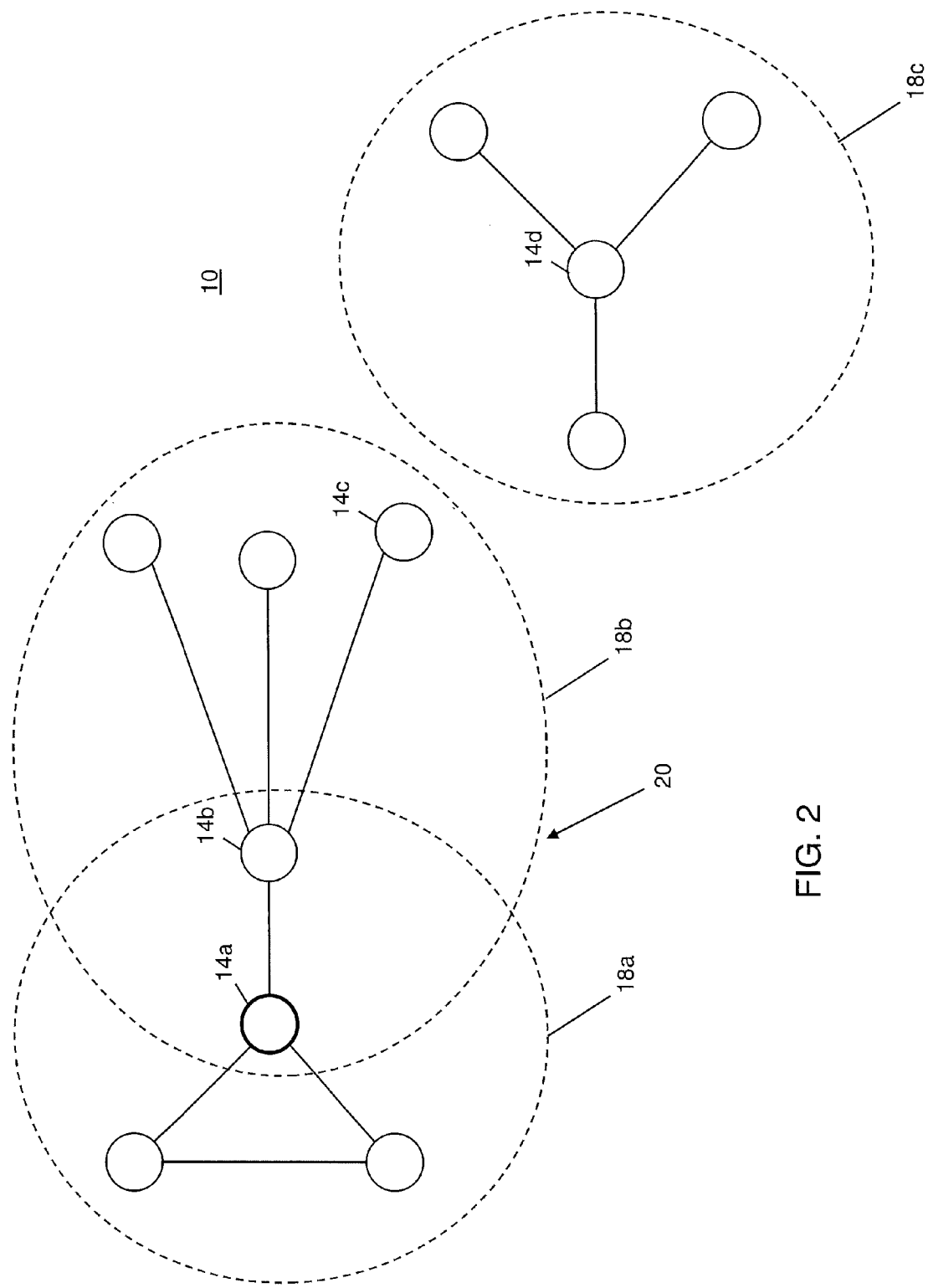
FIG. 2 is a schematic illustration of social network connection groupings.

FIG. 2 illustrates a schematic view of at least a portion of a social network 10 visualized using a node graph, where each node represents a client device 14 or other entity in the social network 10 (also referred to herein as a "member"), and each edge represents a connection between two members. The first client device 14a in the example shown in FIG. 2 has a corresponding first connection network 18a, which includes the connections of the first client device 14a, one of these connections being the second client device 14b. The second client device 14b has a corresponding second connection network 18b, which includes the connections of the second client device 14b, one of these connections being the first client device 14a and another of these connections being the third client device 14c. As shown using dashed lines in FIG. 2, there is an overlap between the first and second connection networks 18a, 18b, which may allow the first client device 14a to discover the connections of the second client device 14b and vice versa. A third connection network 18c is also shown in FIG. 2, which includes the fourth client device 14d. Since the fourth client device is not connected to any of the first, second, or third client devices 14a, 14b, 14c, the corresponding connection network 18c is separate from and thus may not be visible to the first, second, or third client devices 14a, 14b, 14c without having a more comprehensive view of the social network 10.

In addition to providing a more comprehensive and extensive visualization of a social network 10 using a node graph that incorporates members of the social network 10 that are outside of a particular connection network 18 or overlapping connection network 18, it has been recognized that meaningful information about each node can also be conveyed in the node graph in order to promote connections in the social network 10 that may not otherwise be formed. For example, the node graph can be modified by filtering information associated with the attributes or information conveyed by the node graph, according to the members associated with respective nodes in the graph and/or a member associated with a device displaying the node graph. Moreover, by providing a larger view of the social network 10, and the ability to find potentially meaningful connections, such connections can be immediately initiated, e.g., by enabling a chat to be initiated, a message to be sent or posted for the potential connection, etc. It has been found that an available communication service, such as a messaging medium can be leveraged to combine visualization of the social network 10 and searching within the social network 10 beyond a connection network 18, with the ability to quickly and conveniently connect with others, particularly where members of the social network 10 utilize the same underlying messaging or communication platform.

FIG. 3 illustrates an example node graph user interface 22 that may be displayed by, for example, a client device 14. The user interface 22 in the example shown in FIG. 3 includes a central node 24, which corresponds to the user, device, or entity from which the perspective of the node graph is built. The central node 24 is connected to a series of connections 26a, 26b, and 26c in this example, via respective edges 28. The view shown in FIG. 3 includes a connection network 18 associated with the central node 24, and the visualization shown may be referred to as a "friends view" 30. In order to convey additional information (i.e. other than connectivity), it can be appreciated from FIG. 3 that the nodes can be varied in size, shape, color (e.g., by using different colors, different shades, etc.), transparency, amount of information shown, etc. Similarly, although not shown in FIG. 3, it can be appreciated that additional information such as connection strength or relevance can be conveyed by altering the edges 28, e.g., using different dash styles, colors, shapes, sizes, thicknesses, etc. For example, a pair of members who have interacted significantly may have a thicker edge 28 than other members who do not interact as much. Similarly, shape (solid line, dashed line, dotted line, etc.) and color of the edges 28 can further define the interaction and/or relationship between respective nodes 24, 26.

The size of a node can be used as an indicator for how emphasized a certain attribute is for that node compared to other nodes. For example, if the attribute is the number of songs listened to by the social network member, and member A listened to more songs than member B, member A would be represented by a larger node than member B. In another example, the shape of the node can be altered to identify special nodes, e.g., certain shapes could be used for "top" users of an attribute. If a member is ranked among these top users, its node could be represented by a shape which differs from the rest of the "ordinary" members who are not amongst top users for that attribute. Another example includes using different node shapes to distinguish members from different regions, e.g. members from Germany having all the same shape while the shape used for nodes from the U.K. is different. Such differentiation can be particularly advantageous for location based features and groups. Similarly, color coding can also be used to distinguish between nodes or to attract attention to a group of nodes. For example, colors can be used to indicate members with similar tastes in music such that members having access to the user interface 22 can see which other members have similar tastes in music and immediately have the ability to interact with those members.

It can be appreciated that conveying information regarding the similarity of members shown in the node graph, combined with color coding of the nodes 24, 26, can be used as a visual recommendation system. For example, similarity can be defined as "how similar is the music taste of two users", "how similar two or more attributes are between two users", etc. Similarity of a specific member to every other member in the social network node graph can be calculated and ranked. Thereafter, color coding may be used to indicate which users are more similar to the central node 24, and which are less. Depending on choice of granularity, this color coding may be expressed by, e.g., two colors, three or more colors, a gradient of the same color, etc.

It can also be appreciated that a member may navigate through the node graph while being offered or proposed with other members the social networking service 12 determines as strong/weak candidates with which to connect. The member may then use the user interface 22 to explore attributes of the recommended other members, and select to add connections. Since the recommended members may already be connected to the member's current connections, the user interface 22 can be configured to show and recommend only disconnected nodes. In other words, the user interface 22 may be configured such that the member would be able to see a level of similarity amongst all nodes and, amongst the nodes they are not connected to, which nodes are recommended to them, as well as how strongly these nodes are recommended to them.

To facilitate navigation of the node graph in the user interface 22, e.g., for finding members having particular attributes; panning, zooming, and rotating of the node graph can be enabled. Providing the ability to explore a social network in this way enables members of the social network 10 to make new connections in a more efficient and intuitive way. Members can interact with other members by tapping, clicking, using 3D gestures (i.e. gestures in "air" and not requiring physical interaction), etc.; to select particular nodes based on information conveyed in the node graph. Furthermore, node selection can be presented in an intuitive and attractive way to the user such as by changing the color of the node, animating the selected node (e.g., providing an effect which simulates the node coming out of the display screen). Once a node has been selected, the user may be presented with a menu from which they can select certain actions to interact with the selected node or further explore attributes of the member represented by the node (see also FIG. 11 discussed below).

In FIG. 3, the first connection node 26a includes a smaller node than the third connection node 26c, which are both smaller than the central node 24, suggesting a weaker association for the attribute or characteristic being visualized (e.g., music tastes, demographics, etc.). On the other hand, the second connection node 26b is shown having a node that is relatively larger than the other connection nodes 26 as well as being larger than the central node 24, suggesting a relatively stronger association for the attribute or characteristic being visualized. It can be appreciated that the central node 24 and connection nodes 26 may be depicted in different colors and may be distinctly colored from nodes outside of the friends view 30 (e.g., see FIGS. 5, 6, and 7).

As discussed above, the user interface 22 may be configured to enable zooming, panning, rotating (e.g., in a 3D view), for traversing the social network 10 to view potential connections, visualize the extent of the network, find other members, etc. FIG. 4 illustrates a first expanded or zoomed view 32 of the social network 10 that includes a disconnected or otherwise independent connection network 18 for a potential contact 34, illustrated by the dashed line. By selecting the potential contact 34, the central node 24 may view attributes or additional information concerning the potential contact, initiate a chat, post a message, etc.

FIG. 5 illustrates a second tier view 36, including the central node's connection network 18, and the connections of those in the connection network 18, i.e. a "connections' connections" or "friends of friends" view. It can be appreciated that the central node 24 and connection nodes 26 may be depicted in different colors and may be distinctly colored from nodes outside of the connection network 18, similar to the view shown in FIG. 3.

Figure 6:
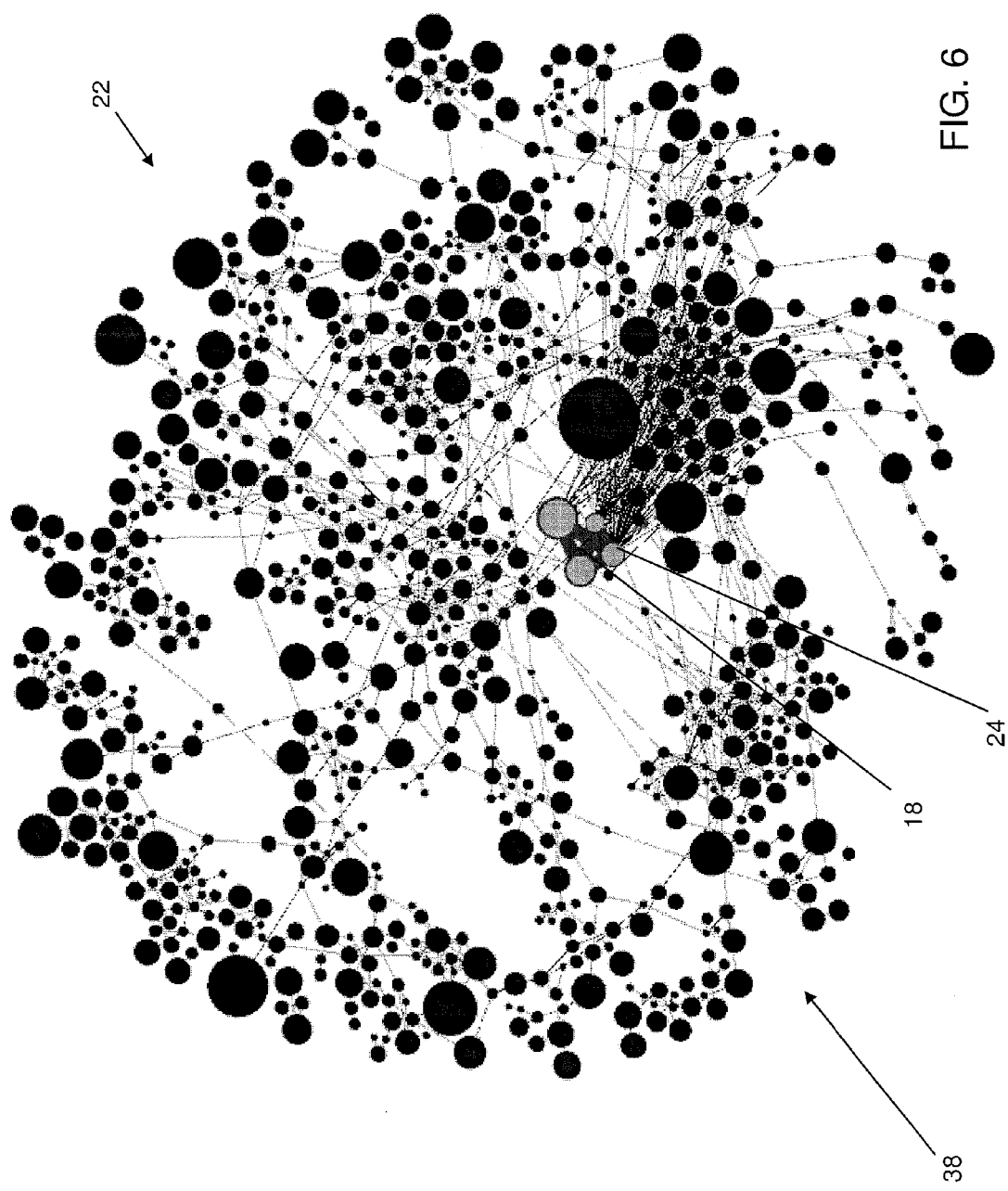
FIG. 6 is an example of a user interface providing a visualization of social network connections.
Figure 7:
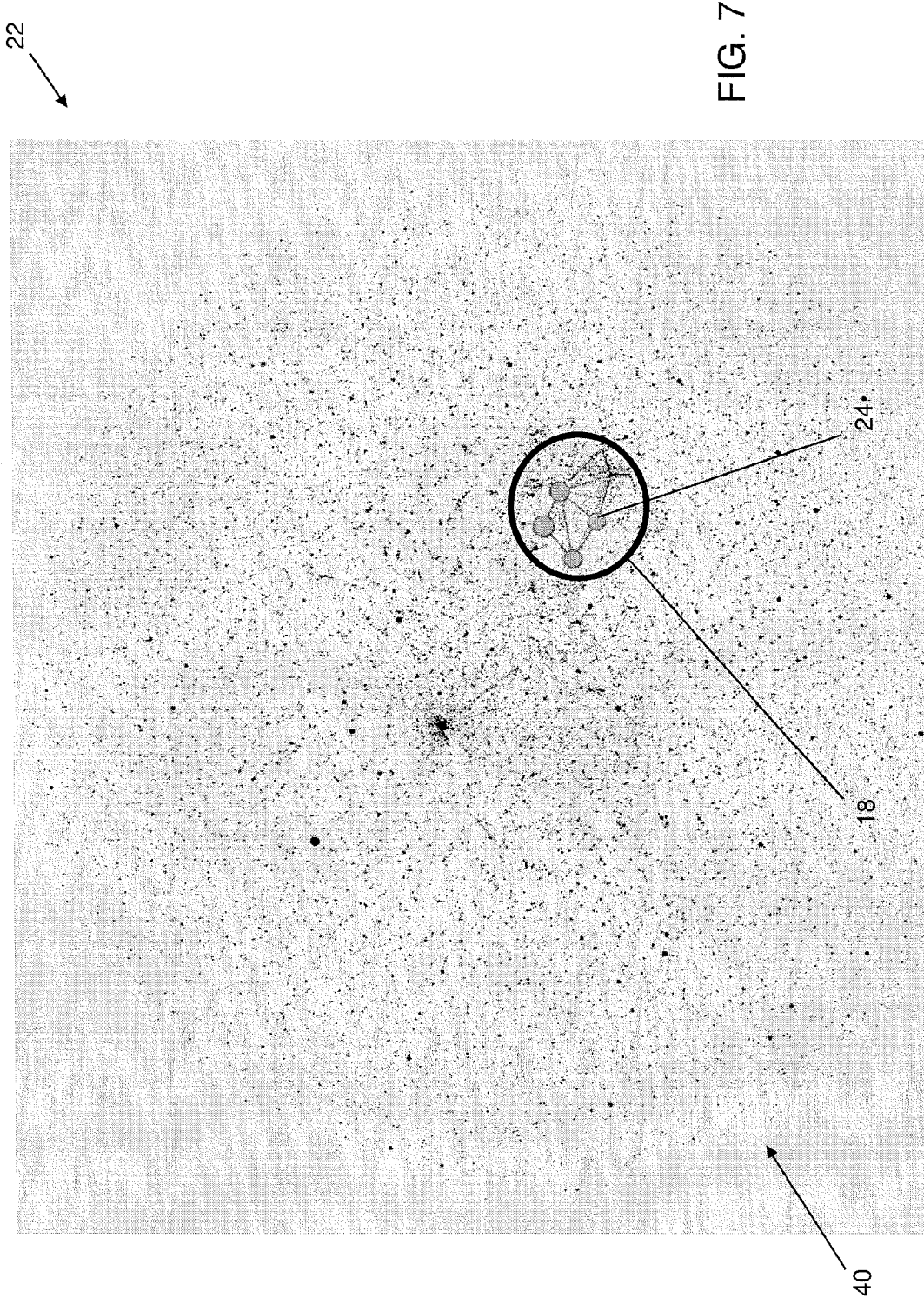
FIG. 7 is an example of a user interface providing a visualization of social network connections.

The user interface 22 can be configured to provide any number of views and/or tiers of views. For example, FIG. 6 illustrates an expanded view 38 with respect to the second tier view 36 shown in FIG. 5. The user interface 22 may be further manipulated to zoom out to show the entire social network 10 in a complete view 40 as shown in FIG. 7. As can be seen in both FIGS. 6 and 7, the central node 24 and connection network 18 can be depicted in different colors and may be distinctly colored from nodes outside of the connection network 18 (encircled in FIG. 7).

It can be appreciated that any of the views provided within the user interface 22, e.g. those views shown in FIGS. 3-7, may be displayed in 2-dimensions or 3-dimensions. Since the nodes 24, 26 and edges 28 may have many attributes that could be conveyed, in some examples it may be difficult or impracticable to display all associated attributes at once. Even if it is possible to convey all attributes at the same time, the view may become quite complex, thus detracting from the convenience of the node graph. For instance, a view which contains information regarding: a) number of common friends, b) total number of friends, c) most popular music libraries, d) recently subscribed members, e) number of songs listened to, f) number of "likes" received, g) number of comments received, etc.; could provide a user experience which is counter to the aim to provide simplicity and convenience. To account for potentially complex node graphs, views may be filtered by an attribute or a set of attributes such that user is presented with manageable amounts of information. To that end, information carried by size, shape and color of the nodes 24, 26 and edges 28 can be configured to depend on the feature or attribute that is "in focus", and which are subject to change when a new feature is brought into focus.

For example, if a user is first interested in "friend counts" of the members, members with higher friend counts would have larger nodes while "top" users with the most number of friends have a different node shape. If the focus changes from friends count to "number of songs listened to by each user", the node 24, 26 and edge 28 characteristics could change as well. This allows the user to look for different things when navigating through the node graph, e.g., since a member having many friends may not listen to music frequently or have access to as many songs and these attributes can be independently illustrated and explored. The panning, zooming, and rotating, in 2-D or 3-D views can also enable users to navigate into and out of regions of interest in order to gather particular information, while having the ability to change attributes and continue to zoom, pan, rotate, etc. for finding different information about other members. Furthermore, navigation can be enhanced by changing a "camera angle" and panning/zooming in/out or rotating while the camera is at various angles with respect to the plane of the screen.

It can be appreciated that when a user pans towards the boundaries of the node graph, or zooms in/out too much, a situation may arise wherein there are no nodes to display on the screen. This could cause the user to loose track of their position. It has been found that after a navigation input is received, if the next view does not include any nodes, the user may not understand if they have zoomed in too much, if they have panned in one direction too far, or if they are zoomed out so much that the nodes cannot be seen any more. By instinct the user may react by providing further input in order to bring themselves back to a view having at least one node, such that they can recover the graph and continue navigating. However, since the user may have lost track of where they are, the further input may worsen the situation by, for example, zooming or panning even further away from a desired location. In order to address this issue, panning, zooming and rotating can be limited such that there is always at least one node displayed on the screen. If the user attempts to continue with an input which would cause the final node to disappear, that input may be ignored. In this way, the user interface 22 can be configured to always shows a node to facilitate recovering a particular view in the node graph in order to continue navigation.

The user interface 22 may also be configured to provide a "game" mode, wherein the user is provided with the ability to navigate through a 3-D view similar to a flight navigation system or video game. Such navigation can be controlled through any available input mechanism such as a mouse, keyboard, joystick, by tilting the device (e.g., to operate accelerometer), tap or 3D gestures, etc. In the game mode, a user may be provided with the ability to fly between the nodes 24, 26, navigate in all available directions, accelerate, slow down, come to a full stop and explore surroundings. In other words, the user interface may enable the node graph to be navigated in three dimensions using a plurality of smooth movements through successive views. Nodes 24, 26 and edges 28 with different sizes, shapes, colors, etc. can be used to capture the attention of the user.

It can be appreciated that if a specific view includes a high number of nodes, to minimize and/or avoid performance issues when drawing the node graph, a maximum number on nodes 24, 26 may be enforced, for a requested view. If the number of nodes for a requested view is higher than this maximum value, only the largest/more relevant nodes are displayed. The limit can be assigned under various conditions, e.g., depending on screen resolution, central processing unit power, graphical processor unit power, etc. of the device displaying the user interface 22.

Figure 8:
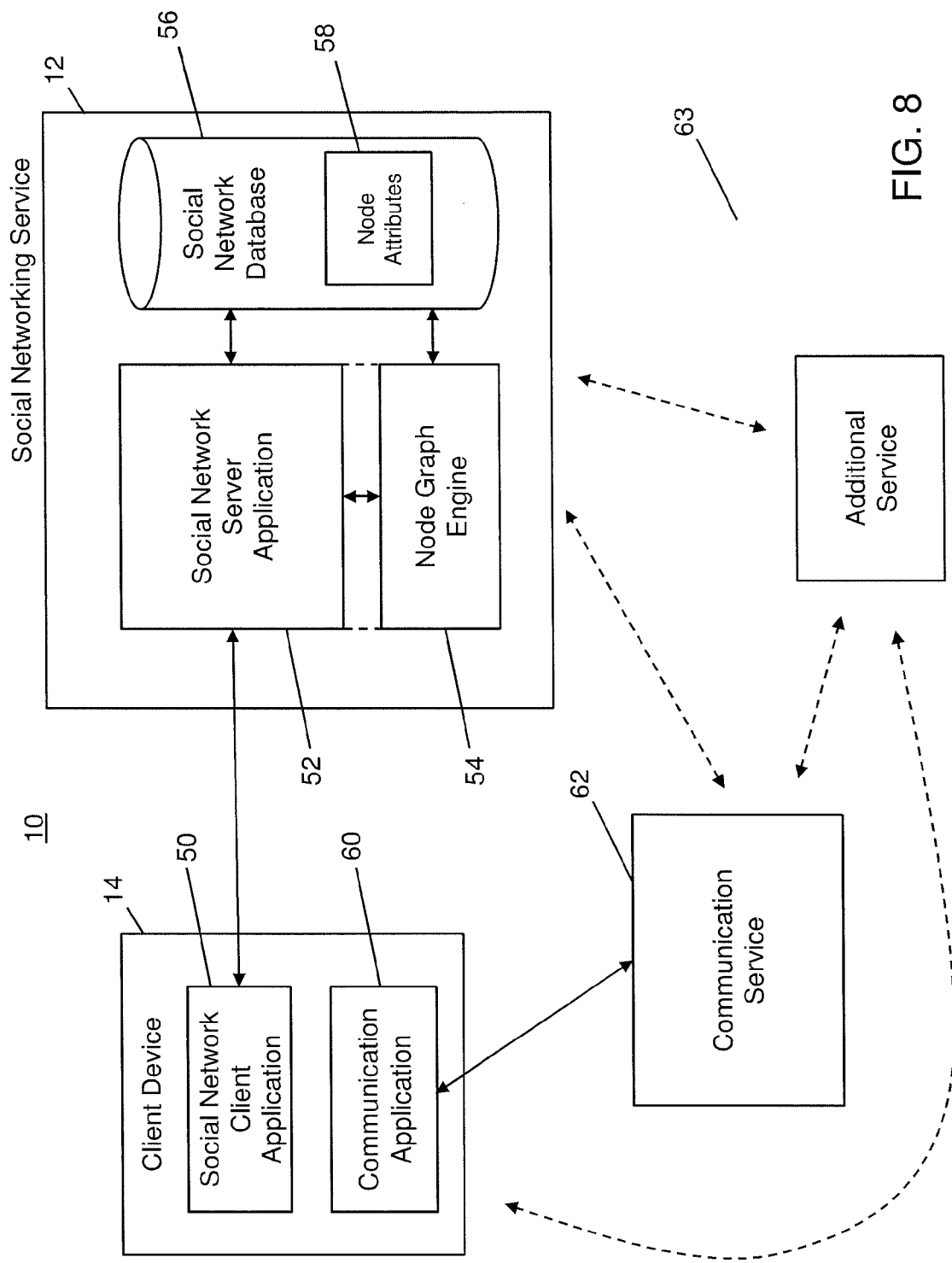
FIG. 8 is a block diagram illustrating an example of a social network client and server communication configuration.

Turning now to FIG. 8, an example configuration for the social network 10 is shown. It can be appreciated that only one client device 14 and one social networking service 12 are shown in FIG. 8 for ease of illustration, and any one or more of each may be members of or utilized within the social network 10. The client device 14 includes a social network client application 50 that is configured to communicate with a social network server application 52 hosted or otherwise provided by the social networking service 12. The social networking service 12 also includes a node graph engine 54, which may be a distinct component, entity or service, or may be a component of, or functionality provided by the social network server application 52 (as illustrated using dashed lines in FIG. 8). The node graph engine 54 and social network server application 52 include or otherwise have access to a social network database 56, which stores information and data associated with the social network 10, e.g., membership data, connection data, service data (e.g., services consumed), etc. As shown in FIG. 8, the social network database 56 includes node attributes 58, which specify attributes for members represented by nodes in the node graph, illustrated using the user interface 22. For example, the node attributes 58 may be used to determine how to size nodes based on a service consumption such as number of songs played. The node attributes 58 represent data that is used by the node graph engine 54 to generate a node graph that can visually represent the social network 10 in the user interface 22, e.g., as shown in FIGS. 3-7. It can be appreciated that the node attributes 58 may also be generated or determined by the node graph engine 54 from the data stored in the social network database 56 (e.g., "on-the-fly") and therefore is shown for illustrative purposes only.

Also shown in FIG. 8 is a communication service 62, which may include messaging (e.g., email, instant messaging, short message service (SMS), etc.), file transport (e.g., file transport protocol (FTP), document sharing service, etc.), telephony (e.g., cellular, voice and/or video over Internet Protocol (VoIP), etc.), or any other suitable service. In the examples described below, an instant messaging-based communication service 62 is used to enable social network members to communicate with prospective connections by interacting with the user interface 22. It can be appreciated that various other types of communications may also be used in order to enable social network members to communicate with each other to initiate connections. For example, email requests, social network-based invitations, text messages, etc.

The social networking service 12 and the communication service 62 may also be part of the same network infrastructure, part of the same service or system, or otherwise related to each other. For example, the communication service 62 may provide a framework or platform on which the social networking service 12 operates, such that connections within the communication service 62 may be extended to also be connections within the social networking service 12. In one example, an instant messaging based environment supported by an instant messaging communication service 62 provides an additional social networking service 12 wherein the communication service 62 facilitates the communications between social networking members. It can be appreciated that in such examples, the client devices 14 may also interact with additional systems 63, which may also interact with the social networking service 12 and/or communication service 62, e.g., a media service enabling media files to be downloaded and played by client devices 14.

In some examples, the node graph engine 54 or equivalent functionality may also be operated on the client device 14, e.g., by enabling the functionality of the node graph engine to be provided by the social network client application 50, the communication application 60, or an independent application or service residing on the client device 14. In such examples, the node attributes 58 may be requested from the social networking service 12 by the social network client application 50 and the building or "drawing" of the node graph performed on the client device 14. In the following examples, the node graph engine 54 is assumed to be operated by or otherwise hosted by the social networking service 12 to offload processing requirements of the client devices 14 and to minimize bandwidth requirements for sending node attributes.

Figure 9:
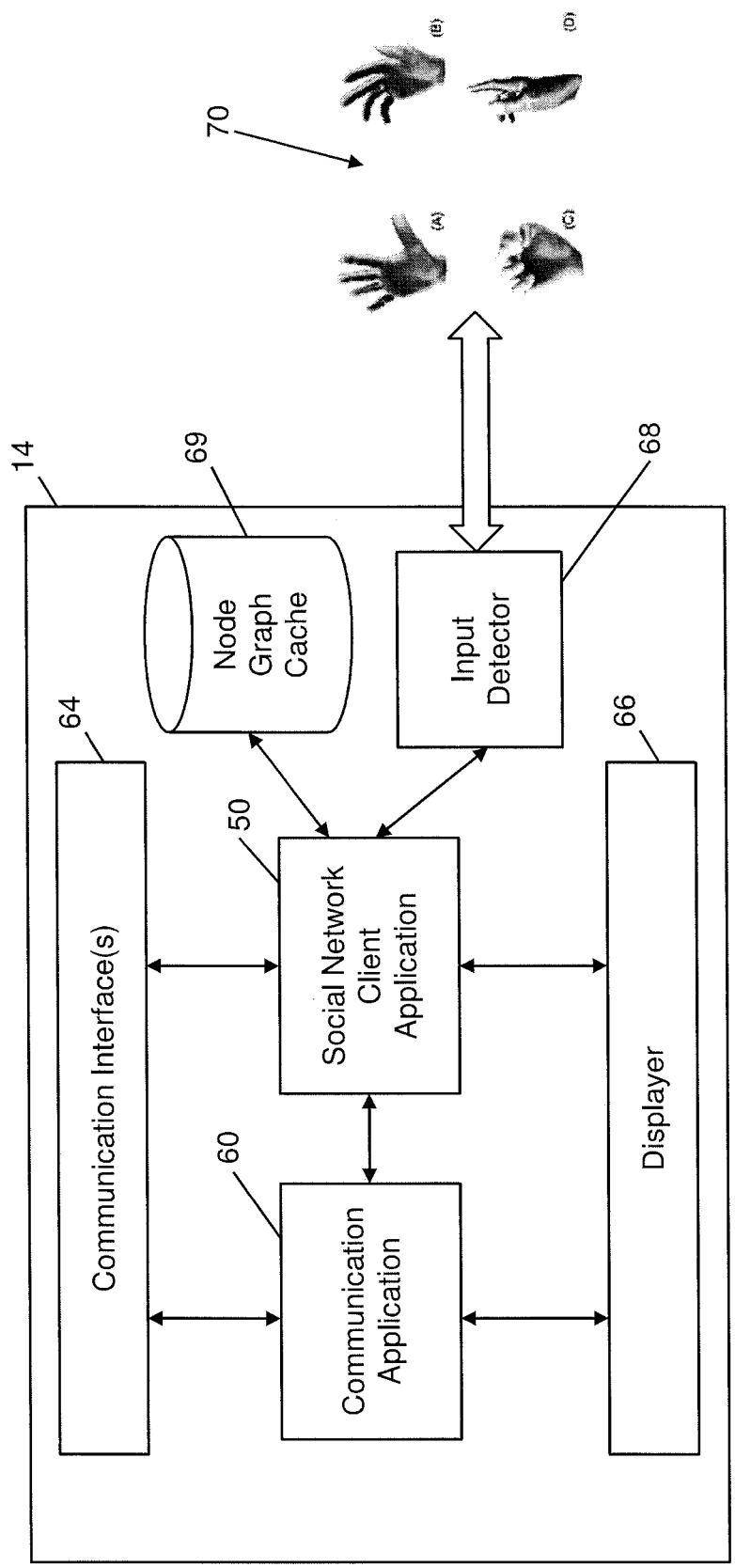
FIG. 9 is a block diagram illustrating an example of a configuration for a client device.

FIG. 9 illustrates an example of a configuration for a client device 14 operable to communicate within the social network 10. The client device 14 includes one or more communication interfaces 64 to enable the client device 14 to, for example, connect or access the network 16. The communication interfaces 64 may provide various radio access technologies, such as cellular and WiFi, as well as short range communication connections via Bluetooth, infrared, near-field communications (NFC), etc. The client device 14 also includes a displayer 66 for displaying content and user interface elements on a display screen provided by the client device 14. The social network client application 50 and communication application 60 shown in FIG. 8 are also illustrated in FIG. 9. The social network client application 50 in this example includes or otherwise has access to a node graph cache 69 for storing node graphs and/or information enabling a node graph for the user interface 22 to be more efficiently rendered or drawn by the social network client application 50. An input detector 68 is also shown in FIG. 9, which may include any suitable sensor or device capable of detecting an input to the client device 14, e.g., an imaging device or touch pad for tracking physical or 3D gestures 70, a microphone for tracking voice, etc. It can be appreciated that various other input mechanisms may be provided by the client device 14, e.g., touchscreen interfaces, buttons, keyboards, etc.

FIGS. 10 and 11 illustrate exterior views of example client devices 14, a smart phone type client device 14a as shown in FIG. 10, and a tablet type client device 14b shown in FIG. 11. In FIG. 10, the smart phone 14a includes a display screen 72a that displays a zoomed in view 36a of the second tier view 36 shown in FIG. 5 in a user interface 22a. In FIG. 11, the tablet 14b includes a display screen 72b that displays a zoomed out view 36b (relative to the view 36a) of the second tier view 36 in a user interface 22b. Also shown in FIG. 11 is a node for a potential contact 34, which may be selected or highlighted. In the example shown in FIG. 11, selecting the potential contact 34 from the user interface 22b invokes a menu 74 that includes a series of options 76 for interacting with the node and potential contact 34. The options shown in FIG. 11 by way of example without limitation, "Like this user", "Send comment", "Initiate chat" 78, "Invite as contact", "Invite to group", and "View attributes" 80. The Initiate chat option 78 enables a user to immediately begin contacting the potential contact 34 to initiate a connection. The user interface 22 therefore not only uses visually distinguishable characteristics to recommend or highlight particular members, but also allows connections to be established conveniently from directly within the user interface 22 as potential contacts 34 are explored. The View attributes option 80 allows the user to explore various attributes of the potential contact 34, from which the node graph is built. For example, the node shown for the potential contact 34 may be enlarged as shown in FIG. 11 based on consumption of a particular service, similarity to the user in a particular way, etc. By noticing the relatively large node, the user may be drawn to interacting with the node to explore further details and attributes exposed with respect to the potential contact 34. It can be appreciated that the information and attributes being exposed may be subject to privacy settings or other user controls provided by the social network client application 50 of the client device 14 used by the potential contact 34.

Figure 12:
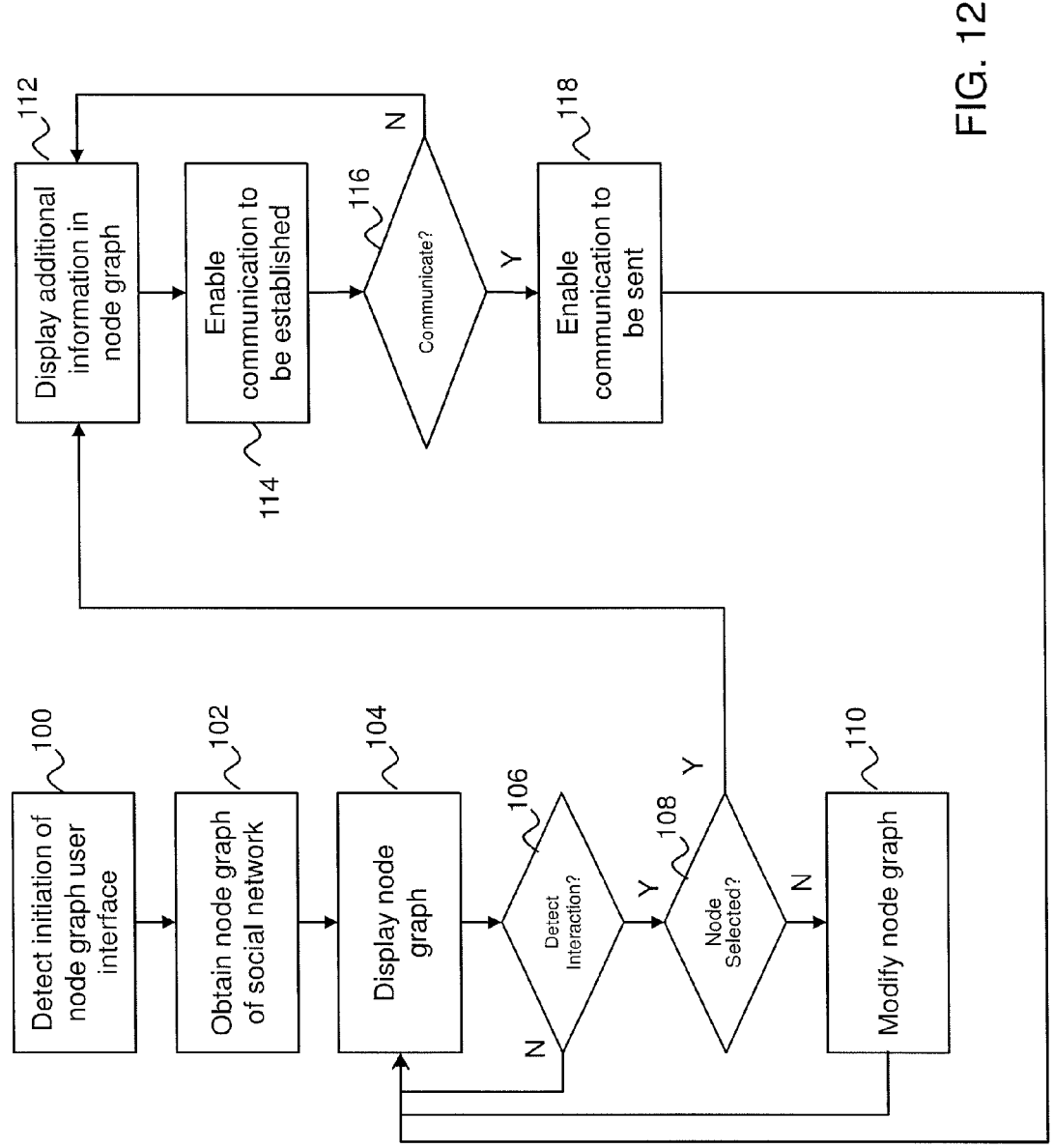
FIG. 12 is a flow chart illustrating example computer executable operations that may be executed in navigating a social network using a visualization of social network connections.

FIG. 12 provides a flow chart illustrating example computer executable operations that may be executed in navigating a social network 10 using the user interface 22 herein exemplified. At 100 the social network client application 50 detects initiation of the user interface 22 for displaying the node graph and obtains the node graph at 102. As discussed above, the node graph may be requested from the social networking service 12 or generated on the client device 14 using node attributes 58 requested from the social networking service 12. The node graph is displayed in the user interface 22 at 104 and the social network client application 50 determines at 106 whether or not an interaction with the user interface has been detected (e.g., pan, zoom, rotate, select, etc.). If no interactions have been detected at 106, the social network client application 50 may continue to display the node graph at 104. If an interaction has been detected at 106, the social network client application 50 determines at 108 whether or not a node has been selected. If not, the node graph is modified at 110 according to the non-selection type interaction, e.g., to redraw a zoomed view 36a.

If the social network client application 50 determines at 108 that a node has been selected, additional information may be displayed in the node graph at 112, e.g., by displaying a menu 74 as shown in FIG. 11. The additional information displayed at 112 in this example includes an ability to communicate with the member associated with the selected node at 114, e.g., by providing the Initiate chat option 78 in the menu 74. The social network client application 50 determines at 116 whether or not a communication has been initiated. If not, the additional information may continue to be provided at 112. If the social network client application 50 determines at 116 that an attempt to communicate with the potential contact 34 has been initiated, the social network client application 50 enables a communication to be sent at 118, e.g., by having a new message or conversation composed and sent using the communication application 60.

FIG. 13 provides a flow chart illustrating example computer executable operations that may be executed in obtaining a node graph at 102 in FIG. 12. The example shown in FIG. 13 assumes that the node graph is generated by the social networking service 12, however, it can be appreciated that the principles illustrated in FIG. 13 may also be applied to examples wherein the node graph is generated on and/or by the client device 14. At 120 the social network server application 52 determines the social network connections within the social network 10, e.g., from social network data in the database 56. The social network server application 52 also determines node attributes 58 at 122, which includes information that can be associated with a particular node and permits comparison amongst a plurality of nodes, e.g., number of songs listened to and/or downloaded, number of likes, etc. The node graph engine 54 generates the node graph at 124 based on the connections and the node attributes 58.

It can be appreciated that the node graph may be pre-generated periodically by the social network server application 52 or "on demand", as shown by way of dashed lines in FIG. 13 after receiving a request at 128. In the example shown in FIG. 13, a request for the node graph is made by the social network client application 50 at 126, which is received at 128 by the social network server application 52. The node graph is either available to the social network server application 52 or is generated by performing 120, 122, and 124 and the node graph is returned to the client device 14 at 130, which is received by the client device 14 at 132.

FIG. 14 provides a flow chart illustrating example computer executable operations that may be executed by the node graph engine 54 in generating a node graph at 124 for use in the user interface 22. At 134 the node graph engine 54 draws the nodes of the social network 10 based on current membership data, and connects the nodes using edges 28 at 136, using current connectivity data. It can be appreciated that any suitable node graph generation algorithm may be used by the node graph engine 54 to connect the nodes, for example, Force Atlas, Force Atlas 2, OpenOrd, etc. The node graph engine 54 determines the attributes to be visualized in the node graph at 138, e.g., by referencing the node attributes 58, and modifies the nodes and/or edges 28 of the node graph at 140 according to relative differences between the nodes with respect to these attributes.

Figure 15:
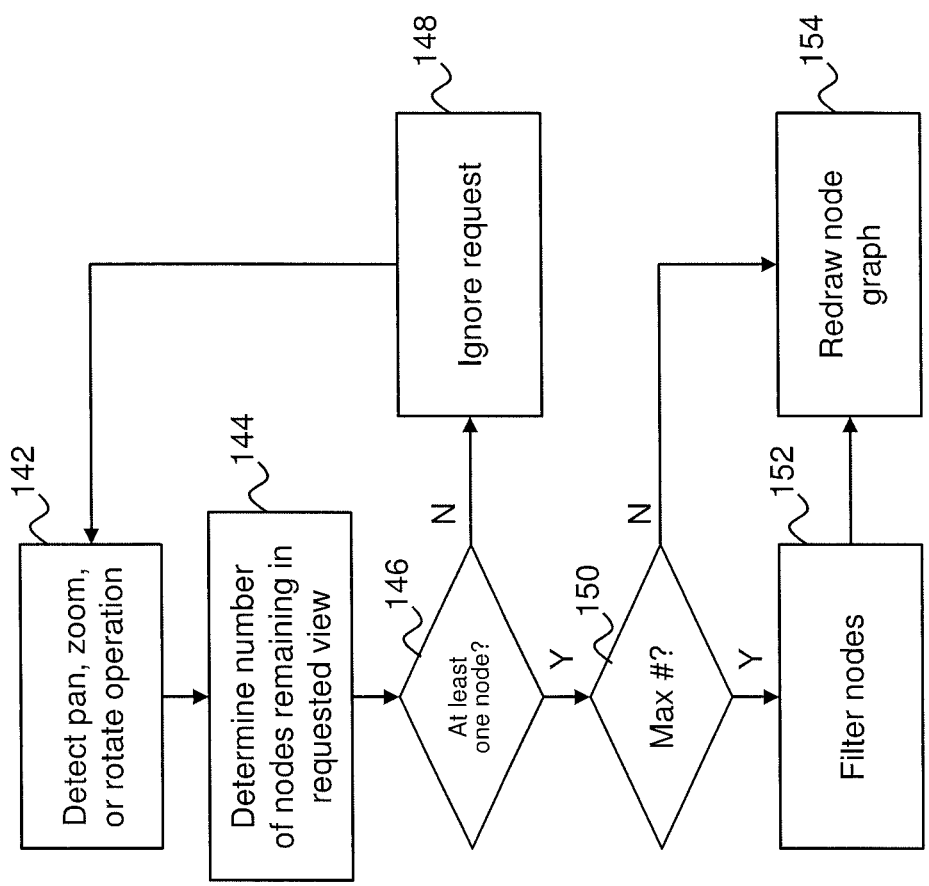
FIG. 15 is a flow chart illustrating example computer executable operations that may be executed in controlling zoom, pan and rotation operations when interacting with a node graph.

FIG. 15 provides a flow chart illustrating example computer executable operations that may be executed in controlling zoom, pan and rotation operations when a node graph is being interacted with, e.g., along path 106 (Y) to 108 (N) to 110 in FIG. 12. In the present example, it may be assumed that the information required to modify the node graph according to the detected interaction is available from or can be inferred from information in or associated with the node graph provided by the social network server application 52. At 142 the social network client application 50 detects a pan, zoom, or rotate operation and determines at 144 the number of nodes remaining in the requested view. For example, in a zoom operation, the social network client application 50 determines how many nodes would be visible if the requested depth of zooming is applied. The social network client application 50 determines at 146 whether or not at least one node would be visible. If not, the request to perform the requested operation is ignored at 148. In this way, the social network client application 50 can inhibit operations that lead to an unusable or confusing rendering of the node graph. If at least one node would be shown, social network client application 50 determines at 150 whether or not a maximum number of nodes would be displayed. If so, the nodes to be displayed are filtered at 152, e.g., to eliminate nodes that are less likely to be of interest to the user, e.g., based on weak associations or being less engaged with the social network 10, before redrawing the node graph accordingly at 154. The maximum number of nodes can be preset or dynamically determined based on the available screen space or other factors associated with the client device 14 and/or social network client application 50. If the maximum number of nodes would not be reached, the node graph can be redrawn at 154 according to the requested operation detected at 142.

Accordingly, there is provided a method for social network navigation, the method comprising: obtaining a node graph from a social networking service, the node graph comprising a plurality of nodes visualizing a social network, each node having an associated profile corresponding to a member in the social network; displaying the node graph; enabling navigation through the node graph to display portions of the node graph in corresponding views; updating the displayed node graph after receiving an update for at least one profile from the social networking service; and updating the displayed node graph after detecting a first interaction with at least one node in the node graph.

There is also provided a method for enabling social network navigation, the method comprising: determining connections between a plurality of members of a social network; determining at least one attribute that enables the plurality of members to be distinguished from each other; generating a node graph visualizing the social network according to the connections and the at least one attribute; associating a profile with each node in the node graph, each profile comprising information associated with the at least one attribute; providing the node graph to a client device; and providing at least one update for the node graph to the client device after determining a change in at least one profile.

There is also provided an electronic client device for social network navigation, the client device comprising: a display for displaying a node graph comprising a plurality of nodes visualizing a social network in a graphical user interface, each node having an associated profile corresponding to a member in the social network; a communication interface for communicating with a social networking service to obtain the node graph from the social networking service and to receive an update for at least one profile from the social networking service; at least one input mechanism for enabling navigation through the node graph to display portions of the node graph in corresponding views in the graphical user interface, and for enabling interactions with the nodes in the node graph; a processor; and a memory comprising computer executable instructions executed by the processor to: display the node graph on the display; enable navigation through the node graph to display the corresponding views; update the displayed node graph after receiving the update; and update the displayed node graph after detecting a first interaction with the node graph using the at least one input mechanism.

There is also provided a computer readable storage medium comprising computer executable instructions for social network navigation, the computer executable instructions comprising instructions for: obtaining a node graph from a social networking service, the node graph comprising a plurality of nodes visualizing a social network, each node having an associated profile corresponding to a member in the social network; displaying the node graph; enabling navigation through the node graph to display portions of the node graph in corresponding views; updating the displayed node graph after receiving an update for at least one profile from the social networking service; and updating the displayed node graph after detecting a first interaction with at least one node in the node graph.

There is also provided a server device comprising a processor, a communication interface, and memory, the memory comprising computer executable instructions for enabling social network navigation, the computer executable instructions comprising instructions for: determining connections between a plurality of members of a social network; determining at least one attribute that enables the plurality of members to be distinguished from each other; generating a node graph visualizing the social network according to the connections and the at least one attribute; associating a profile with each node in the node graph, each profile comprising information associated with the at least one attribute; providing the node graph to a client device using the communication interface; and providing at least one update for the node graph to the client device using the communication interface, after determining a change in at least one profile.

There is also provided a computer readable storage medium comprising computer executable instructions for enabling social network navigation, the computer executable instructions comprising instructions for: determining connections between a plurality of members of a social network; determining at least one attribute that enables the plurality of members to be distinguished from each other; generating a node graph visualizing the social network according to the connections and the at least one attribute; associating a profile with each node in the node graph, each profile comprising information associated with the at least one attribute;

providing the node graph to a client device; and providing at least one update for the node graph to the client device, after determining a change in at least one profile.

Figure 16:
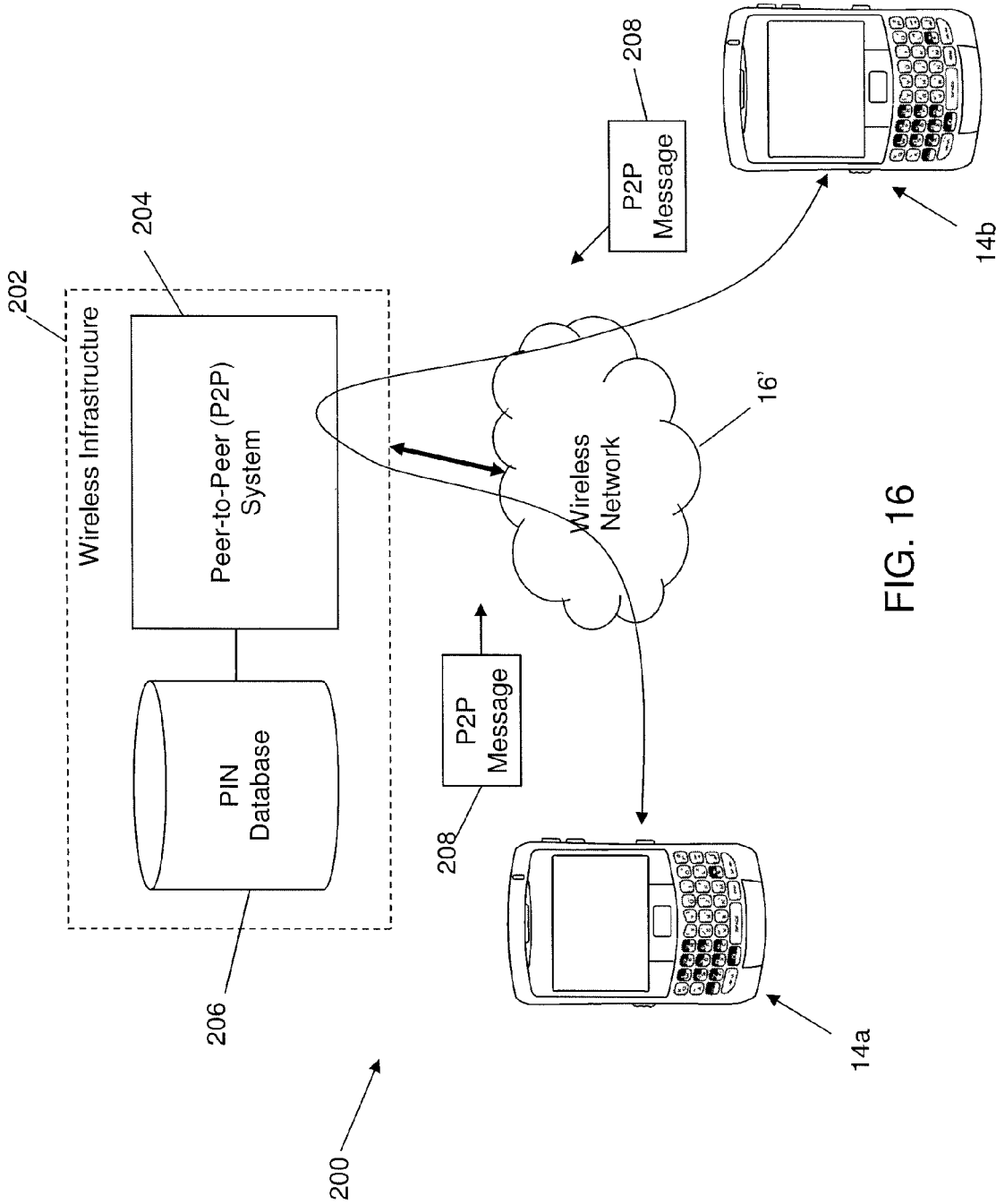
FIG. 16 is a is a schematic illustration of an example peer-to-peer communication system.

As discussed above, the social network client application 50 may be incorporated into or otherwise provided by or with a P2P-based communication application 30 and underlying system. An example of a P2P communication system 200 including a wireless infrastructure 202, is shown in FIG. 16. The communication system 200, at least in part, enables the client devices 14 (e.g. the first client device 14a and second client device 14b as shown in FIG. 16) to communicate via a peer-to-peer (P2P) system 204. In this example, the P2P system 204 is accessed by connecting to a wireless network 16'. The P2P system 204 enables, in some examples, a first client device 14a to find a second client device 14b using a visualization of social network connections, determine further information regarding at least one attribute associated with the second client device 14b, and communicate with the second client device 14b, e.g., in order to establish a new connection with the second client device 14b.

In the example shown in FIG. 16, a first client device 14a is shown communicating with a second client device 14b. The first and second client devices 14a, 14b are illustrated as being mobile devices such as smart phones. However, it can be appreciated that other types of electronic devices configured to conduct P2P messaging may also be capable of communicating with or within the communication system 200. It will also be appreciated that although the examples shown herein are directed to mobile communication devices, the same principles may apply to other devices capable of communicating with the P2P system 204. For example, an application (not shown) hosted by a desktop computer or other "non-portable" or "non-mobile" device may also be capable of communicating with other devices (e.g., including first and second client devices 14a, 14b) using the P2P system 204.

The P2P system 204 is, in this example, a component of the wireless infrastructure 202 associated with the wireless network 16'. The wireless infrastructure 202 in this example includes, in addition to the P2P system 204, and among other things not shown for simplicity, a person identification number (PIN) database 206. The PIN database 206 in this example is used to store one or more PINs associated with particular devices, whether they are subscribers to a service provided by the wireless infrastructure 202 or otherwise. To illustrate operation of the P2P system 204 with respect to FIGS. 16 to 18, the first and second client devices 14a, 14b will be referred to commonly as "mobile devices 14".

One of the mobile devices 14 may communicate with the other of the mobile devices 14 and vice versa via the P2P system 204, in order to perform P2P messaging or to otherwise exchange P2P-based communications. For ease of explanation, in the following examples, any P2P-based communication may also be referred to as a P2P message 208 as shown in FIG. 5.

Figure 17:
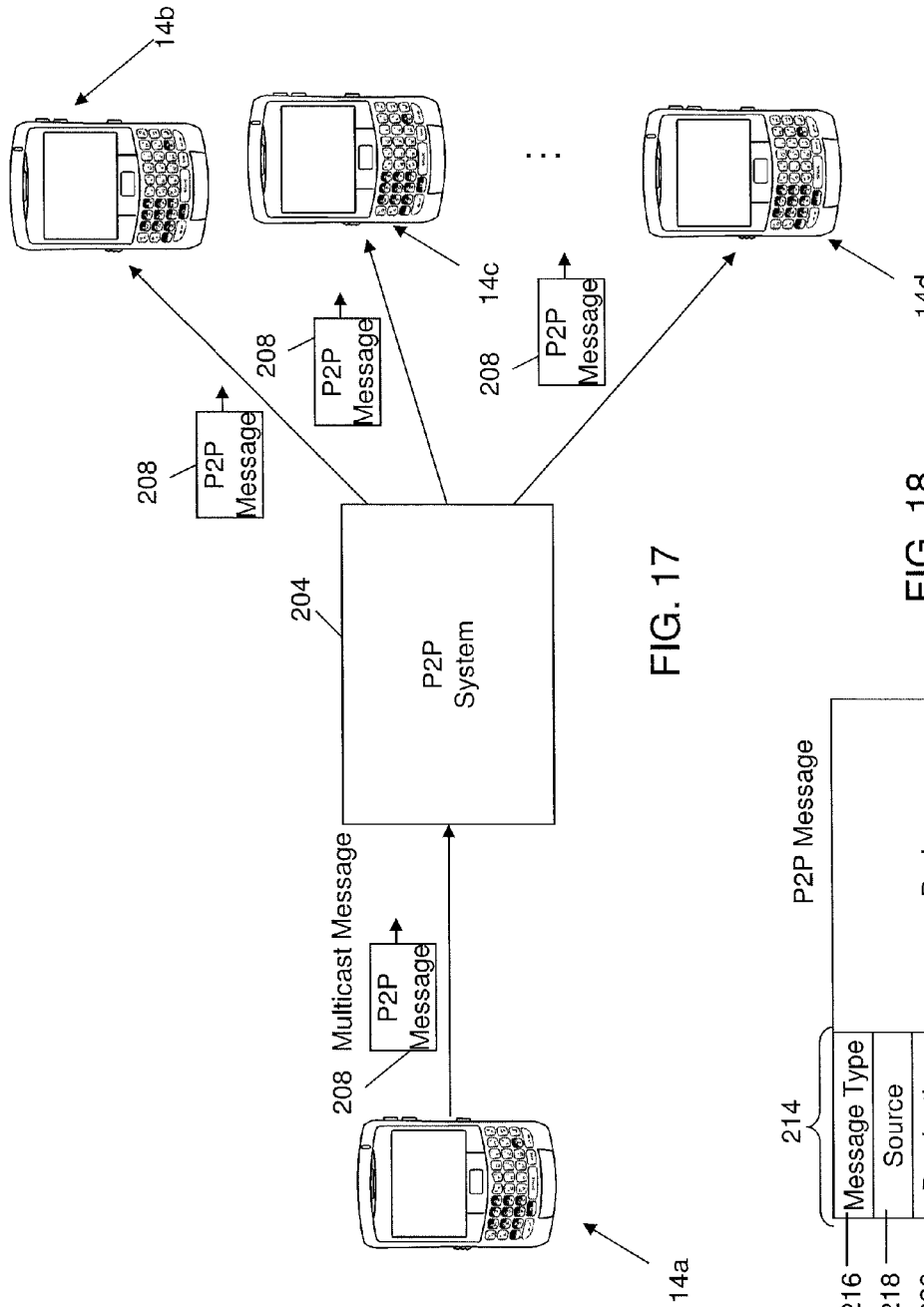
FIG. 17 is a schematic illustration of an example multi-cast message delivery in a peer-to-peer communication system.

In some examples, the P2P system 204 may be capable of sending multi-cast messages, i.e. forwarding a single message from a sender to multiple recipients without requiring multiple P2P messages 56 to be generated by such sender. For example, as shown in FIG. 17, the P2P system 204 can be operable to enable a single P2P message 208 to be sent by a first client device 14a to multiple recipient client devices 14b, 14c, and 14d, by addressing the P2P message 208 to multiple corresponding P2P addresses, and having the P2P system 204 multicast the P2P message 208 to those recipient client devices 14b, 14c, and 14d.

Figure 18:
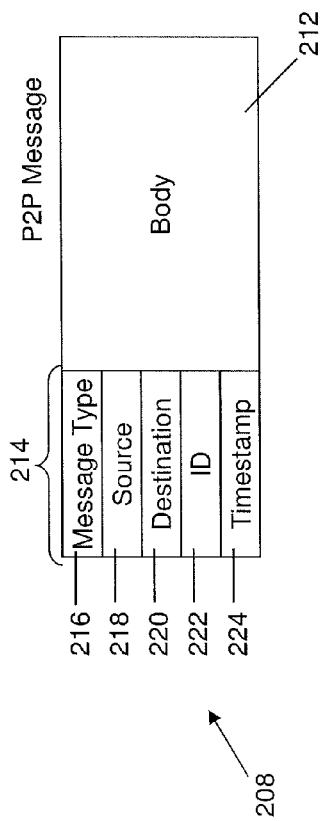
FIG. 18 is a schematic illustration of an example peer-to-peer message.

An example P2P message 208 is shown in greater detail in FIG. 18, and has a format that is particularly suitable for a PIN-to-PIN based system. In a typical P2P protocol, each P2P message 208 has associated therewith a source corresponding to the mobile device 14 which has sent the P2P message 208 and includes a destination identifying the one or more intended recipients. Each P2P message 208 in this example includes a body 212, which contains the content for the P2P message 208 (e.g., text or other data), and a header 214, which contains various fields used for transmitting and processing each P2P message 208. In this example, the header 214 includes a message type field 216 to specify the type of transmission (e.g., chat, registration, block, presence, sharing session etc.), a source field 218 to specify the device address for the sender, a destination field 220 to specify the device address(es) for the one or more intended recipients, an ID field 222 to identify the corresponding P2P application (e.g., see communication application 60 in FIGS. 8 and 9) and a timestamp field 224 to indicate the time (and if desired, the date) at which the P2P message 208 was sent by the designated sender.

It can be appreciated that in this example, the ID field 222 can be used to specify the application ID to identify a P2P application on the mobile device 14. Where the P2P application relates to, for example, an IM system, the message type field 216 can also be used to designate an IM communication, and the ID field 222 may then correspond to a conversation ID, i.e. a conversation thread the P2P message 208 corresponds to (e.g., such that each P2P message 208 is identified by the conversation in which it was sent).

It will be appreciated that other information or attributes may be included in the P2P message 208, such as a subject field (not shown) to enable a subject for part or all of a conversation (in an IM embodiment) to be transported with the P2P message 208 (e.g., to create new subjects, modify subjects, notify others of subjects, etc.), or application details field (not shown) to provide application-specific information such as the version and capabilities of the application.

The P2P system 204 can utilize any suitable P2P protocol operated by, for example, a P2P router (not shown), which may be part of the wireless infrastructure 202. It can be appreciated however that a stand-alone P2P configuration (i.e. that does not rely on the wireless infrastructure 202—not shown) may equally apply the principles herein. The P2P system 204 may also enable mobile devices 14 to communicate with desktop computers, thus facilitating, for example, communications such as instant messaging between mobile applications and desktop applications on the desktop computer.

The P2P system 204 can be implemented using a router-based communication infrastructure, such as one that provides email, Short Message Service (SMS), voice, Internet and other communications. Particularly suitable for hosting a P2P messaging router, is a wireless router or server used in systems such as those that provide push-based communication services. In FIG. 16, the wireless infrastructure 202 facilitates P2P communications such as instant messaging between mobile devices 14. P2P messaging, such as IMing, is provided by an associated application stored on each mobile device 14, e.g., an IM application, which can be initiated, for example, by highlighting and selecting an icon from a display as is well known in the art. The P2P system 204 routes messages between the mobile devices 14 according to the P2P protocol being used. For example, the P2P protocol may define a particular way in which to conduct IM or other types of messaging.

In general, in a P2P protocol, the sender of the P2P message 208 knows the source address of the intended recipient, e.g., a PIN. Knowledge of the source address may be established when the two devices request to add each other to their respective contact or buddy lists. A particular mobile device 14 can communicate directly with various other mobile devices 14 through the P2P system 204 without requiring a dedicated server for facilitating communications. In other words, the P2P system 204 enables the mobile devices 14 to communicate with each other directly over the wireless infrastructure 202 in accordance with the P2P protocol.

When conducting a P2P session according to the example shown in FIG. 16, the mobile devices 14 can communicate directly with the wireless infrastructure 202 in a client based exchange where, as noted above, an intermediate server is not required. A P2P message 208 sent by one mobile device 14 is received by the wireless infrastructure 202, which obtains the source address for the intended recipient (or recipients) from information associated with the P2P message 208 (e.g., a data log) or from the P2P message 208 itself. Upon obtaining the recipient's address according to the P2P protocol, the wireless infrastructure 202 then routes the P2P message 208 to the recipient associated with the mobile device 14 having such address (or recipients having respective addresses). The wireless infrastructure 202 typically also provides a delivery confirmation to the original sender, which may or may not be displayed to the user. The destination device can also provide such delivery information. The wireless infrastructure 202 may be capable of routing P2P messages 208 reliably as well as being capable of holding onto the P2P messages 208 until they are successfully delivered. Alternatively, if delivery cannot be made after a certain timeout period, the wireless infrastructure 202 may provide a response indicating a failed delivery. The wireless infrastructure 202 may choose to expire or delete a P2P message 208 if a certain waiting period lapses.

Figure 19:
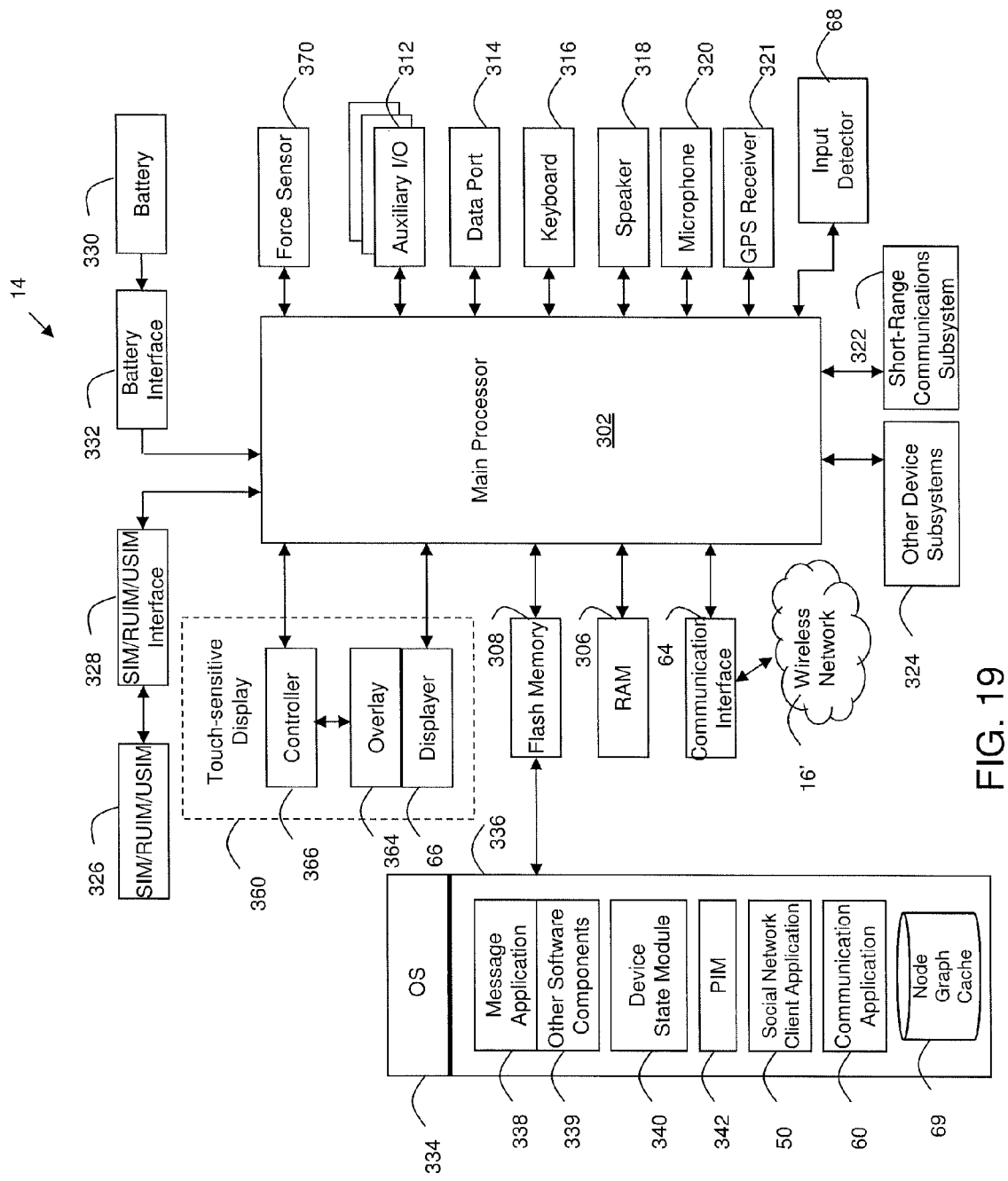
FIG. 19 is an example of a configuration for a mobile device.

Referring to FIG. 19, to further aid in the understanding of the example client devices 14 described above, shown therein is a block diagram of an example configuration of a client device 14 configured as a "mobile device", referred to commonly as "mobile device 14". The mobile device 10 includes a number of components such as a main processor 302 that controls the overall operation of the mobile device 14. Communication functions, including data and voice communications, are performed through a communication interface 64. The communication interface 64 receives messages from and sends messages to a wireless network 16'. In this example of the mobile device 14, the communication interface 64 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 64 with the wireless network 16' represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, an input detector 68 (e.g., configured to detect gestures), short-range communications subsystem 322, and other device subsystems 324. Some of the subsystems of the mobile device 14 perform communication-related functions, whereas other subsystems may provide "resident" or on-device functions. By way of example, the touch-sensitive display 360 and the keyboard 316 may be used for both communication-related functions, such as entering a text message for transmission over the wireless network 16', and device-resident functions such as a calculator or task list. In one example, the mobile device 14 can include a non-touch-sensitive display in place of, or in addition to the touch-sensitive display 360. For example the touch-sensitive display 360 can be replaced by a displayer 66 that may not have touch-sensitive capabilities.

The mobile device 14 can send and receive communication signals over the wireless network 16' after required network registration or activation procedures have been completed. Network access is associated with a subscriber or user of the mobile device 14. To identify a subscriber, the mobile device 14 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 14 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 14. Although current technology makes use of a battery, future technologies such as micro fuel cells may provide the power to the mobile device 14.

The mobile device 14 also includes an operating system 334 and software components 336 to 342, 50, 60 and 69. The operating system 334 and the software components 336 to 342, 50, 60 and 69, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 50, 60 and 69, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 14 during its manufacture. Software applications may include a message application 338, a device state module 340, a Personal Information Manager (PIM) 342, a social network client application 50, a communication application 60, and a node graph cache 69. A message application 338 can be any suitable software program that allows a user of the mobile device 14 to send and receive electronic messages, wherein messages are typically stored in the flash memory 308 of the mobile device 14. A device state module 340 provides persistence, i.e. the device state module 340 ensures that important device data is stored in persistent memory, such as the flash memory 308, so that the data is not lost when the mobile device 14 is turned off or loses power. A PIM 342 includes functionality for organizing and managing data items of interest to the user, such as, but not limited to, e-mail, contacts, calendar events, and voice mails, and may interact with the wireless network 16'.

Other types of software applications or components 339 can also be installed on the mobile device 14. These software applications 339 can be pre-installed applications (i.e. other than message application 338) or third party applications, which are added after the manufacture of the mobile device 14. Examples of third party applications include games, calculators, utilities, etc.

The additional applications 339 can be loaded onto the mobile device 14 through at least one of the wireless network 16', the auxiliary I/O subsystem 312, the data port 314, the short-range communications subsystem 322, or any other suitable device subsystem 324.

The data port 314 can be any suitable port that enables data communication between the mobile device 14 and another computing device. The data port 314 can be a serial or a parallel port. In some instances, the data port 314 can be a Universal Serial Bus (USB) port that includes data lines for data transfer and a supply line that can provide a charging current to charge the battery 330 of the mobile device 14.

For voice communications, received signals are output to the speaker 318, and signals for transmission are generated by the microphone 320. Although voice or audio signal output is accomplished primarily through the speaker 318, the displayer 66 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The displayer 66 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

In some examples, an optional force sensor 370 or force sensors is disposed in any suitable location, for example, between the touch-sensitive display 360 and a back of the mobile device 14 to detect a force imparted by a touch on the touch-sensitive display 360. The force sensor 370 may be a force-sensitive resistor, strain gauge, piezoelectric or piezoresistive device, pressure sensor, or other suitable device.

In addition to touch inputs (e.g., touch gestures), the input detector 58 is operable to detect 3D gestures, e.g., by capturing images of a user's hands and correlating information in such images to pre-assigned gesture information. For example, a 3D gesture including a spreading action between the thumb and forefinger can be correlated to a zooming gesture and apply a corresponding zooming action to the node graph 22. By storing a pre-assigned set of gestures, the social network client application 50 can provide a controlled navigation experience that is familiar in various views within the node graph 22.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the client devices 14, server application 52, social networking service 12, communication service 62, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method for social network navigation, the method comprising:
   obtaining a node graph from a social networking service, the node graph comprising a plurality of nodes visualizing a social network, each node having an associated profile corresponding to a member in the social network;
   displaying a presentation of the node graph;
   receiving a first interaction indicating one of zooming in and zooming out of the presentation the node graph;
   updating the display of the node graph after receiving an update for at least one profile associated with nodes within the plurality of nodes from the social networking service;
   updating the display of the node graph based on receiving the first interaction to change the presentation of the node graph to an updated presentation of the node graph, wherein the updating comprises:
      based on the first interaction indicating zooming in, limiting the zooming in to include at least a defined minimum number of nodes in the updated presentation of the node graph; and
      based on the first interaction indicating zooming out, limiting a number of nodes in the updated presentation of the node graph to be less than a defined maximum number of nodes,
      wherein the minimum number of nodes and the maximum number of nodes are independent of connections between nodes;

receiving a second indication selecting at least one node within the presentation of the node graph;

displaying, based on receiving the second indication, a menu comprising a plurality of actions, the plurality of actions comprising a communications option enabling a communication to be sent to a device associated with the at least one of the node; and sending, based on a selection of the communications option within the menu, a communication to the device associated with the at least one node.

2. The method of claim 1, wherein the communication comprises at least one of a message, an invitation, a comment, and a rating.

3. The method of claim 1, further comprising enabling information associated with the profiles to be viewed.

4. The method of claim 1, further comprising receiving a third interaction comprising at least one of a panning operation, and a rotation operation.

5. The method of claim 1, wherein the first interaction is detected from a gesture.

6. The method of claim 5, wherein the gesture is compared to a plurality of pre-assigned gesture defining information.

7. The method of claim 1, further comprising enabling the node graph to be navigated in three dimensions using a plurality of smooth movements through successive views simulating three-dimensional movement about the node graph.

8. The method of claim 1, wherein the presentation of the node graph is iteratively determined after a predefined delay after a previous determination of the presentation.

9. The method of claim 1, wherein each profile comprises a plurality of attributes, each attribute having an associated value, the method further comprising:

receiving an indication of a selected attribute; and modifying, based on receiving the indication of the selected attribute and based on a respective value of the selected attribute for each respective node, a display characteristic of each respective node within at least one of the presentation and the updated presentation.

10. The method of claim 9, wherein the receiving an indication of a selected attribute comprises determining a local attribute associated with a profile associated with a member associated with a device displaying the presentation, and wherein the local attribute is received as the selected attribute.

11. The method of claim 1, further comprising:

determining a defined number of top profiles, the top profiles having associated values of a selected attribute larger than other profiles; and modifying the node graph to depict nodes associated with the top profiles with a different visual characteristic than other nodes within at least one of the presentation and the updated presentation.

12. The method of claim 1, wherein each profile comprises a plurality of attributes, each attribute having an associated value, the method further comprising:

receiving an indication of a selected attribute, and wherein the presentation of the node graph comprises respective connection indications between a first node and at least one other respective node within the node graph, the respective connection indications representing a connection between the first node and the at least one other respective node, and wherein the representation of the respective connection indications in the presentation of the node graph and the updated presentation of the node graph indicate a respective associated value of the selected attribute relative to a value of the selected attribute associated with the first node.

13. The method of claim 1, wherein the first interaction indicates zooming out of the presentation, and wherein updating the display of the node graph based on receiving the first interaction comprises including within the display of the node graph with no direct or indirect connection to each other.

14. The method of claim 1, wherein each profile comprises a plurality of attributes, each attribute having an associated value, the method further comprising:

receiving an indication of a selected attribute, and wherein the node graph includes a presentation of a first node, wherein the presentation of the node graph comprises respective edges indicating respective connections between the first node and at least one other respective node within the node graph, and wherein each respective edge connects the first node to a respective connected node and has a respective visual characteristic indicating a respective associated value of an attribute of the respective connected node.

15. The method of claim 14, wherein the respective visual characteristic comprises a thickness based upon the respective associated value.

16. An electronic client device for social network navigation, the client device comprising:

a display for displaying a presentation of a node graph comprising a plurality of nodes visualizing a social network in a graphical user interface, each node having an associated profile corresponding to a member in the social network;

a communication interface for communicating with a social networking service to obtain the node graph from the social networking service and to receive an update for at least one profile associated with nodes within the plurality of nodes from the social networking service;

at least one input mechanism for enabling navigation through the node graph to display portions of the node graph in corresponding views in the graphical user interface, and for enabling interactions with the nodes in the node graph, the at least one input mechanism receiving a first interaction indicating one of zooming in and zooming out of the presentation;

a processor; and a memory comprising computer executable instructions executed by the processor to:

display the presentation of the node graph on the display;

enable navigation through the node graph to display the corresponding views;

update the displayed display of the node graph after receiving the update;

update the displayed display of the node graph based on receiving the first interaction using the at least one input mechanism, the update changing the presentation of the node graph to an updated presentation of the node graph, wherein the update comprises:

based on the first interaction indicating zooming in, limiting the zooming in to include at least a defined minimum number of nodes in the updated presentation of the node graph; and based on the first interaction indicating zooming out, limiting a number of nodes in the updated presentation of the node graph to be less than a defined maximum number of nodes, wherein the minimum number of nodes and the maximum number of nodes are independent of connections between nodes;

receive a second indication selecting at least one node within the presentation of the node graph;

display, based on receiving the second indication, a menu comprising a plurality of actions, the plurality of actions comprising a communications option enabling a communication to be sent to a device associated with the at least one of the node; and send, based on a selection of the communications option within the menu, a communication to the device associated with the at least one node.

17. A non-transitory computer readable storage medium comprising computer executable instructions for social network navigation, the computer executable instructions comprising instructions for:

obtaining a node graph from a social networking service, the node graph comprising a plurality of nodes visualizing a social network, each node having an associated profile corresponding to a member in the social network;

displaying a presentation of the node graph;

receiving a first interaction indicating one of zooming in and zooming out of the presentation enabling navigation through the node graph to display portions of the node graph in corresponding views;

updating the displayed display of the node graph after receiving an update for at least one profile associated with nodes within the plurality of nodes from the social networking service;

updating the displayed display of the node graph based on receiving the first interaction to change the presentation of the node graph to an updated presentation of the node graph, wherein the updating comprises:

based on the first interaction indicating zooming in, limiting the zooming in to include at least a defined minimum number of nodes in the updated presentation of the node graph; and based on the first interaction indicating zooming out, limiting a number of nodes in the updated presentation of the node graph to be less than a defined maximum number of nodes, wherein the minimum number of nodes and the maximum number of nodes are independent of connections between nodes;

receiving a second indication selecting at least one node within the presentation of the node graph;

displaying, based on receiving the second indication, a menu comprising a plurality of actions, the plurality of actions comprising a communications option enabling a communication to be sent to a device associated with the at least one of the node; and sending, based on a selection of the communications option within the menu, a communication to the device associated with the at least one node.

* * * * *